(12) United States Patent
Scheidelman

(10) Patent No.: US 9,691,085 B2
(45) Date of Patent: Jun. 27, 2017

(54) SYSTEMS AND METHODS OF NATURAL LANGUAGE PROCESSING AND STATISTICAL ANALYSIS TO IDENTIFY MATCHING CATEGORIES

(71) Applicant: Visa International Service Association, San Francisco, CA (US)

(72) Inventor: Edward Scheidelman, Fairfax, CA (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 15/134,261

(22) Filed: Apr. 20, 2016

(65) Prior Publication Data

US 2016/0321705 A1 Nov. 3, 2016

Related U.S. Application Data

(60) Provisional application No. 62/154,973, filed on Apr. 30, 2015.

(51) Int. Cl.
*G06F 17/27* (2006.01)
*G06F 17/21* (2006.01)
*G06Q 30/02* (2012.01)

(52) U.S. Cl.
CPC ......... *G06Q 30/0269* (2013.01); *G06F 17/27* (2013.01)

(58) Field of Classification Search
CPC .. G06F 17/28; G06F 17/2735; G06F 17/2775; G06F 17/2755; G06F 17/30705;

(Continued)

(56) References Cited

U.S. PATENT DOCUMENTS

| 4,906,826 A | 3/1990 | Spencer |
| 4,914,590 A | 4/1990 | Loatman et al. |

(Continued)

FOREIGN PATENT DOCUMENTS

| JP | 2000357204 | 12/2000 |
| JP | 2001175761 | 6/2001 |

(Continued)

OTHER PUBLICATIONS

Bump, General Faq's Feb. 8, 2011.

(Continued)

*Primary Examiner* — Edgar Guerra-Erazo
(74) *Attorney, Agent, or Firm* — Greenberg Traurig, LLP

(57) ABSTRACT

Combining the natural language processing of product descriptions and statistical analysis of payment data to classify consumers based on products purchased and merchants based on products sold. Systems and methods use natural language processing techniques to interpret the descriptions of item level purchase data to classify products that have been purchased by customers into micro-categories. Statistical deviation methods are applied to the payment data to calculate normalized mean product cost, after removing outliers. After determining the micro-categories of the products purchased and the mean product cost of the purchased products, the system and methods classify consumers and merchants into categories based at least in part on the product micro-categories, mean costs, and relative volume of product types sold by merchants to predict which consumers are likely to purchase from which merchants.

20 Claims, 9 Drawing Sheets

(58) Field of Classification Search
CPC ............... G06F 17/2241; G06F 17/27; G06F 17/30616; G06F 17/21
USPC ....................................................... 704/9, 10
See application file for complete search history.

(56) References Cited

U.S. PATENT DOCUMENTS

| | | | |
|---|---|---|---|
| 5,025,372 A | 6/1991 | Burton et al. |
| 5,401,946 A | 3/1995 | Weinblatt |
| 5,592,560 A | 1/1997 | Deaton et al. |
| 5,621,812 A | 4/1997 | Deaton et al. |
| 5,638,457 A | 6/1997 | Deaton et al. |
| 5,684,990 A | 11/1997 | Boothby |
| 5,687,322 A | 11/1997 | Deaton et al. |
| 5,710,886 A | 1/1998 | Christensen et al. |
| 5,924,080 A | 7/1999 | Johnson |
| 5,974,396 A | 10/1999 | Anderson et al. |
| 6,035,280 A | 3/2000 | Christensen |
| 6,055,573 A | 4/2000 | Gardenswartz et al. |
| 6,065,675 A | 5/2000 | Teicher |
| 6,070,147 A | 5/2000 | Harms et al. |
| 6,101,484 A | 8/2000 | Halbert et al. |
| 6,119,101 A | 9/2000 | Peckover |
| 6,119,933 A | 9/2000 | Wong et al. |
| 6,216,129 B1 | 4/2001 | Eldering |
| 6,226,642 B1 | 5/2001 | Beranek et al. |
| 6,282,516 B1 | 8/2001 | Giuliani |
| 6,282,522 B1 | 8/2001 | Davis et al. |
| 6,285,983 B1 | 9/2001 | Jenkins |
| 6,298,330 B1 | 10/2001 | Gardenswartz et al. |
| 6,307,958 B1 | 10/2001 | Deaton et al. |
| 6,321,201 B1 | 11/2001 | Dahl |
| 6,324,519 B1 | 11/2001 | Eldering |
| 6,324,522 B2 * | 11/2001 | Peterson ........................ 705/22 |
| 6,327,574 B1 | 12/2001 | Kramer et al. |
| 6,332,126 B1 | 12/2001 | Peirce et al. |
| 6,334,110 B1 | 12/2001 | Walter et al. |
| 6,377,935 B1 | 4/2002 | Deaton et al. |
| 6,450,407 B1 | 9/2002 | Freeman et al. |
| 6,487,538 B1 | 11/2002 | Gupta et al. |
| 6,505,168 B1 | 1/2003 | Rothman et al. |
| 6,519,571 B1 | 2/2003 | Guheen et al. |
| 6,604,089 B1 | 8/2003 | Van Horn et al. |
| 6,604,239 B1 | 8/2003 | Kohen |
| 6,631,356 B1 | 10/2003 | Van Horn et al. |
| 6,631,372 B1 | 10/2003 | Graham |
| 6,742,003 B2 | 5/2004 | Heckerman et al. |
| 6,834,110 B1 | 12/2004 | Marconcini et al. |
| 6,850,900 B1 * | 2/2005 | Hare ................... G06Q 30/0625 705/26.62 |
| 6,856,992 B2 | 2/2005 | Britton et al. |
| 6,901,406 B2 | 5/2005 | Nabe et al. |
| 6,922,686 B2 | 7/2005 | Okamoto et al. |
| 6,934,508 B2 | 8/2005 | Ceresoli et al. |
| 6,934,690 B1 | 8/2005 | Van Horn et al. |
| 6,938,022 B1 | 8/2005 | Singhal |
| 6,941,376 B2 | 9/2005 | Mitchell et al. |
| 6,996,560 B1 | 2/2006 | Choi et al. |
| 7,003,476 B1 | 2/2006 | Samra et al. |
| 7,024,374 B1 | 4/2006 | Day et al. |
| 7,024,409 B2 | 4/2006 | Iyengar |
| 7,035,855 B1 | 4/2006 | Kilger et al. |
| 7,039,599 B2 | 5/2006 | Merriman et al. |
| 7,062,510 B1 | 6/2006 | Eldering |
| 7,072,847 B2 | 7/2006 | Ulenas et al. |
| 7,107,230 B1 | 9/2006 | Halbert et al. |
| 7,107,249 B2 | 9/2006 | Dively et al. |
| 7,120,590 B1 | 10/2006 | Eisen et al. |
| 7,124,099 B2 | 10/2006 | Mesaros |
| 7,143,143 B1 | 11/2006 | Thompson |
| 7,146,330 B1 | 12/2006 | Alon et al. |
| 7,158,943 B2 | 1/2007 | van der Riet |
| 7,158,955 B2 | 1/2007 | Diveley et al. |
| 7,162,436 B1 | 1/2007 | Eckel, Jr. |
| 7,165,037 B2 | 1/2007 | Lazarus et al. |
| 7,177,822 B2 | 2/2007 | Mahmood et al. |
| 7,181,412 B1 | 2/2007 | Fulgoni et al. |
| 7,181,419 B1 | 2/2007 | Mesaros |
| 7,194,422 B1 | 3/2007 | St. John Killick |
| 7,194,427 B1 | 3/2007 | Van Horn et al. |
| 7,225,142 B1 | 5/2007 | Apte et al. |
| 7,260,837 B2 | 8/2007 | Abraham et al. |
| 7,263,498 B1 | 8/2007 | Van Horn et al. |
| 7,264,152 B2 | 9/2007 | Tsuei et al. |
| 7,269,578 B2 | 9/2007 | Sweeney |
| 7,299,194 B1 | 11/2007 | Manganaris et al. |
| 7,328,169 B2 | 2/2008 | Temares et al. |
| 7,333,998 B2 | 2/2008 | Heckerman et al. |
| 7,337,127 B1 | 2/2008 | Smith et al. |
| 7,340,438 B2 | 3/2008 | Nordman et al. |
| 7,359,866 B2 | 4/2008 | Farat |
| 7,360,251 B2 | 4/2008 | Spalink et al. |
| 7,363,246 B1 | 4/2008 | Van Horn et al. |
| 7,373,311 B2 | 5/2008 | Lambert et al. |
| 7,398,225 B2 | 7/2008 | Voltmer et al. |
| 7,398,226 B2 | 7/2008 | Haines et al. |
| 7,401,731 B1 | 7/2008 | Pletz et al. |
| 7,415,537 B1 | 8/2008 | Maes |
| 7,424,439 B1 | 9/2008 | Fayyad et al. |
| 7,424,441 B2 | 9/2008 | George et al. |
| 7,428,498 B2 | 9/2008 | Voltmer et al. |
| 7,444,658 B1 | 10/2008 | Matz et al. |
| 7,480,627 B1 | 1/2009 | Van Horn et al. |
| 7,490,052 B2 | 2/2009 | Kilger et al. |
| 7,493,655 B2 | 2/2009 | Brown |
| 7,496,524 B2 | 2/2009 | Voltmer et al. |
| 7,526,458 B2 | 4/2009 | Flinn et al. |
| 7,526,485 B2 | 4/2009 | Hagan et al. |
| 7,533,038 B2 | 5/2009 | Blume et al. |
| 7,533,130 B2 | 5/2009 | Narayana et al. |
| 7,536,360 B2 | 5/2009 | Stolfo et al. |
| 7,552,069 B2 | 6/2009 | Kepecs |
| 7,562,030 B1 | 7/2009 | Shapira et al. |
| 7,578,430 B2 | 8/2009 | Michelsen et al. |
| 7,578,435 B2 | 8/2009 | Suk |
| 7,593,871 B1 | 9/2009 | Mesaros |
| 7,613,628 B2 | 11/2009 | Ariff et al. |
| 7,613,629 B2 | 11/2009 | Antonucci et al. |
| 7,624,184 B1 | 11/2009 | Aviani et al. |
| 7,689,463 B1 | 3/2010 | Mesaros |
| 7,689,469 B1 | 3/2010 | Mesaros |
| 7,693,748 B1 | 4/2010 | Mesaros |
| 7,729,945 B1 | 6/2010 | Katz et al. |
| 7,729,977 B2 | 6/2010 | Xiao et al. |
| 7,747,473 B1 | 6/2010 | Mesaros |
| 7,828,206 B2 | 11/2010 | Hessburg et al. |
| 7,904,337 B2 | 3/2011 | Morsa |
| 7,917,388 B2 | 3/2011 | van der Riet |
| 7,933,841 B2 | 4/2011 | Schmeyer et al. |
| 7,953,219 B2 | 5/2011 | Freedman et al. |
| 8,050,968 B2 | 11/2011 | Antonucci et al. |
| 8,055,536 B1 | 11/2011 | Olaiya et al. |
| 8,103,545 B2 | 1/2012 | Ramer et al. |
| 8,131,875 B1 | 3/2012 | Chen et al. |
| 8,140,389 B2 | 3/2012 | Altberg et al. |
| 8,387,858 B2 | 3/2013 | Bohn et al. |
| 8,484,099 B1 | 7/2013 | Pope et al. |
| 8,495,680 B2 | 7/2013 | Bentolila et al. |
| 2001/0027413 A1 | 10/2001 | Bhutta |
| 2001/0049620 A1 | 12/2001 | Blasko |
| 2002/0004733 A1 | 1/2002 | Addante |
| 2002/0019768 A1 | 2/2002 | Fredrickson et al. |
| 2002/0032602 A1 | 3/2002 | Lanzillo, Jr. et al. |
| 2002/0032904 A1 | 3/2002 | Lerner |
| 2002/0042738 A1 | 4/2002 | Srinivasan et al. |
| 2002/0046187 A1 | 4/2002 | Vargas et al. |
| 2002/0053076 A1 | 5/2002 | Landesmann |
| 2002/0059100 A1 | 5/2002 | Shore |
| 2002/0065723 A1 | 5/2002 | Anderson et al. |
| 2002/0072931 A1 | 6/2002 | Card |
| 2002/0095387 A1 | 7/2002 | Sosa et al. |
| 2002/0099649 A1 | 7/2002 | Lee et al. |
| 2002/0107738 A1 | 8/2002 | Beach et al. |

(56) References Cited

U.S. PATENT DOCUMENTS

| | | |
|---|---|---|
| 2002/0123880 A1* | 9/2002 | Brown .............. G06F 17/2827 704/4 |
| 2002/0123928 A1 | 9/2002 | Eldering et al. |
| 2002/0128908 A1 | 9/2002 | Levin et al. |
| 2002/0133400 A1 | 9/2002 | Terry et al. |
| 2002/0133405 A1 | 9/2002 | Newnam et al. |
| 2002/0138346 A1 | 9/2002 | Kodaka et al. |
| 2002/0147645 A1 | 10/2002 | Alao et al. |
| 2002/0161625 A1 | 10/2002 | Brito-Valladares et al. |
| 2002/0174013 A1 | 11/2002 | Freeman et al. |
| 2002/0194137 A1 | 12/2002 | Park et al. |
| 2003/0004808 A1 | 1/2003 | Elhaoussine et al. |
| 2003/0018652 A1 | 1/2003 | Heckerman et al. |
| 2003/0047602 A1 | 3/2003 | Iida et al. |
| 2003/0074267 A1 | 4/2003 | Acharya et al. |
| 2003/0078864 A1 | 4/2003 | Hardesty et al. |
| 2003/0115113 A1 | 6/2003 | Duncan |
| 2003/0191832 A1 | 10/2003 | Satyavolu et al. |
| 2004/0019518 A1 | 1/2004 | Abraham et al. |
| 2004/0024632 A1 | 2/2004 | Perry |
| 2004/0054577 A1 | 3/2004 | Inoue et al. |
| 2004/0054581 A1 | 3/2004 | Redford et al. |
| 2004/0054591 A1 | 3/2004 | Spaeth et al. |
| 2004/0073482 A1 | 4/2004 | Wiggins et al. |
| 2004/0099730 A1 | 5/2004 | Tuchler et al. |
| 2004/0122735 A1 | 6/2004 | Meshkin |
| 2004/0122736 A1 | 6/2004 | Strock et al. |
| 2004/0127192 A1 | 7/2004 | Ceresoli et al. |
| 2004/0133474 A1 | 7/2004 | Tami et al. |
| 2004/0181554 A1 | 9/2004 | Heckerman et al. |
| 2004/0193489 A1 | 9/2004 | Boyd et al. |
| 2004/0193685 A1 | 9/2004 | Proehl |
| 2004/0225509 A1 | 11/2004 | Andre |
| 2004/0225603 A1 | 11/2004 | Allen et al. |
| 2004/0249650 A1 | 12/2004 | Freedman et al. |
| 2004/0249710 A1 | 12/2004 | Smith et al. |
| 2005/0055275 A1 | 3/2005 | Newman et al. |
| 2005/0071225 A1 | 3/2005 | Bortolin et al. |
| 2005/0071227 A1 | 3/2005 | Hammad et al. |
| 2005/0071230 A1 | 3/2005 | Mankoff |
| 2005/0131762 A1 | 6/2005 | Bharat et al. |
| 2005/0131792 A1 | 6/2005 | Rowe |
| 2005/0160002 A1 | 7/2005 | Roetter et al. |
| 2005/0160003 A1 | 7/2005 | Berardi et al. |
| 2005/0216823 A1 | 9/2005 | Petersen et al. |
| 2005/0235310 A1 | 10/2005 | Bies |
| 2005/0251446 A1 | 11/2005 | Jiang et al. |
| 2006/0053056 A1 | 3/2006 | Alspach-Goss et al. |
| 2006/0069619 A1 | 3/2006 | Walker et al. |
| 2006/0103667 A1 | 5/2006 | Amit et al. |
| 2006/0143071 A1 | 6/2006 | Hofmann |
| 2006/0143075 A1 | 6/2006 | Carr et al. |
| 2006/0161527 A1 | 7/2006 | Dwork et al. |
| 2006/0167818 A1 | 7/2006 | Wentker et al. |
| 2006/0178957 A1 | 8/2006 | LeClaire |
| 2006/0190337 A1 | 8/2006 | Ayers, Jr. et al. |
| 2006/0218038 A1 | 9/2006 | Grider |
| 2006/0224454 A1 | 10/2006 | Kantor et al. |
| 2006/0230053 A1 | 10/2006 | Eldering |
| 2006/0253320 A1 | 11/2006 | Heywood |
| 2006/0253323 A1 | 11/2006 | Phan et al. |
| 2006/0259362 A1 | 11/2006 | Cates |
| 2006/0265280 A1 | 11/2006 | Nakada et al. |
| 2006/0265429 A1 | 11/2006 | Pendergast et al. |
| 2006/0287916 A1 | 12/2006 | Starr et al. |
| 2006/0293948 A1 | 12/2006 | Weinblatt |
| 2007/0033104 A1 | 2/2007 | Collins et al. |
| 2007/0038516 A1 | 2/2007 | Apple et al. |
| 2007/0055597 A1 | 3/2007 | Patel et al. |
| 2007/0061256 A1 | 3/2007 | Park et al. |
| 2007/0067267 A1 | 3/2007 | Ives |
| 2007/0067297 A1 | 3/2007 | Kublickis |
| 2007/0084917 A1 | 4/2007 | Fajkowski |
| 2007/0100691 A1 | 5/2007 | Patterson |
| 2007/0124201 A1 | 5/2007 | Hu et al. |
| 2007/0129963 A1 | 6/2007 | Skibinski et al. |
| 2007/0156517 A1 | 7/2007 | Kaplan et al. |
| 2007/0162377 A1 | 7/2007 | Williams |
| 2007/0174295 A1 | 7/2007 | Abraham et al. |
| 2007/0179846 A1 | 8/2007 | Jain et al. |
| 2007/0192121 A1 | 8/2007 | Routson |
| 2007/0192122 A1 | 8/2007 | Routson et al. |
| 2007/0219865 A1 | 9/2007 | Leining |
| 2007/0219866 A1 | 9/2007 | Wolf et al. |
| 2007/0226056 A1 | 9/2007 | Belanger et al. |
| 2007/0226061 A1 | 9/2007 | Chen et al. |
| 2007/0239532 A1 | 10/2007 | Benson et al. |
| 2007/0244741 A1 | 10/2007 | Blume et al. |
| 2007/0260521 A1 | 11/2007 | Van Der Riet |
| 2007/0260736 A1 | 11/2007 | Miller |
| 2007/0265923 A1 | 11/2007 | Krassner et al. |
| 2007/0282681 A1 | 12/2007 | Shubert et al. |
| 2008/0004884 A1 | 1/2008 | Flake et al. |
| 2008/0021772 A1 | 1/2008 | Aloni et al. |
| 2008/0046358 A1 | 2/2008 | Holm-Blagg et al. |
| 2008/0056541 A1 | 3/2008 | Tani et al. |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1 | 3/2008 | Fordyce, III et al. |
| 2008/0065507 A1 | 3/2008 | Morrison et al. |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0077499 A1 | 3/2008 | Ariff et al. |
| 2008/0082393 A1 | 4/2008 | Ozzie et al. |
| 2008/0082397 A1 | 4/2008 | Dennison et al. |
| 2008/0082418 A1 | 4/2008 | Fordyce et al. |
| 2008/0103887 A1 | 5/2008 | Oldham et al. |
| 2008/0103888 A1 | 5/2008 | Weir |
| 2008/0120182 A1 | 5/2008 | Arnold et al. |
| 2008/0120218 A1 | 5/2008 | Reid et al. |
| 2008/0126261 A1 | 5/2008 | Lovett |
| 2008/0133351 A1 | 6/2008 | White et al. |
| 2008/0134228 A1 | 6/2008 | Dion et al. |
| 2008/0147731 A1 | 6/2008 | Narayana et al. |
| 2008/0154703 A1 | 6/2008 | Flake et al. |
| 2008/0154704 A1 | 6/2008 | Flake et al. |
| 2008/0154727 A1 | 6/2008 | Carlson |
| 2008/0162258 A1 | 7/2008 | Kala et al. |
| 2008/0162269 A1 | 7/2008 | Gilbert |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0184117 A1 | 7/2008 | Alsbury et al. |
| 2008/0195465 A1 | 8/2008 | Redmond et al. |
| 2008/0195473 A1 | 8/2008 | Laramy et al. |
| 2008/0201226 A1 | 8/2008 | Carlson et al. |
| 2008/0215436 A1 | 9/2008 | Roberts |
| 2008/0217397 A1 | 9/2008 | Degliantoni et al. |
| 2008/0221972 A1 | 9/2008 | Megdal et al. |
| 2008/0235243 A1 | 9/2008 | Lee et al. |
| 2008/0242317 A1 | 10/2008 | Abhyanker |
| 2008/0255946 A1 | 10/2008 | Altberg et al. |
| 2008/0275771 A1 | 11/2008 | Levine |
| 2008/0275779 A1 | 11/2008 | Lakshminarayanan |
| 2008/0281668 A1 | 11/2008 | Nurminen |
| 2008/0281699 A1 | 11/2008 | Whitehead |
| 2008/0300973 A1 | 12/2008 | DeWitt et al. |
| 2008/0301037 A1 | 12/2008 | Monk |
| 2008/0301102 A1 | 12/2008 | Liang |
| 2008/0306790 A1 | 12/2008 | Otto et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0320512 A1 | 12/2008 | Knight |
| 2009/0006203 A1 | 1/2009 | Fordyce, III et al. |
| 2009/0006363 A1 | 1/2009 | Canny et al. |
| 2009/0018895 A1 | 1/2009 | Weinblatt et al. |
| 2009/0030793 A1 | 1/2009 | Fordyce, III |
| 2009/0036103 A1 | 2/2009 | Byerley et al. |
| 2009/0043593 A1 | 2/2009 | Herbrich et al. |
| 2009/0043648 A1 | 2/2009 | Mahdian et al. |
| 2009/0048884 A1 | 2/2009 | Olives et al. |

(56) References Cited

U.S. PATENT DOCUMENTS

| | | |
|---|---|---|
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0084842 A1 | 4/2009 | Vriheas et al. |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0125396 A1 | 5/2009 | Otto et al. |
| 2009/0132347 A1 | 5/2009 | Anderson et al. |
| 2009/0132366 A1 | 5/2009 | Lam et al. |
| 2009/0132395 A1 | 5/2009 | Lam et al. |
| 2009/0132404 A1 | 5/2009 | King et al. |
| 2009/0144122 A1 | 6/2009 | Ginsberg et al. |
| 2009/0144146 A1 | 6/2009 | Levine et al. |
| 2009/0144201 A1 | 6/2009 | Gierkink et al. |
| 2009/0144205 A1 | 6/2009 | Hurry |
| 2009/0157511 A1 | 6/2009 | Spinnell et al. |
| 2009/0157512 A1 | 6/2009 | King |
| 2009/0172551 A1 | 7/2009 | Kane et al. |
| 2009/0172728 A1 | 7/2009 | Shkedi et al. |
| 2009/0187462 A1 | 7/2009 | Gevelber et al. |
| 2009/0192882 A1 | 7/2009 | Narahashi et al. |
| 2009/0204472 A1 | 8/2009 | Einhorn |
| 2009/0216579 A1 | 8/2009 | Zen et al. |
| 2009/0216606 A1 | 8/2009 | Coffman et al. |
| 2009/0216616 A1 | 8/2009 | Wang et al. |
| 2009/0222323 A1 | 9/2009 | Kelly et al. |
| 2009/0234708 A1 | 9/2009 | Heiser, II et al. |
| 2009/0234711 A1 | 9/2009 | Ramer et al. |
| 2009/0234715 A1 | 9/2009 | Heiser, II et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0254476 A1 | 10/2009 | Sharma et al. |
| 2009/0259518 A1 | 10/2009 | Harvey et al. |
| 2009/0271305 A1 | 10/2009 | Lal et al. |
| 2009/0271327 A1 | 10/2009 | Lal et al. |
| 2009/0276317 A1 | 11/2009 | Dixon et al. |
| 2009/0299846 A1 | 12/2009 | Brueggemann et al. |
| 2009/0300490 A1 | 12/2009 | Lejano et al. |
| 2009/0327892 A1 | 12/2009 | Douillet et al. |
| 2010/0030644 A1 | 2/2010 | Dhamodharan |
| 2010/0042517 A1 | 2/2010 | Paintin et al. |
| 2010/0049620 A1 | 2/2010 | Debow |
| 2010/0057549 A1 | 3/2010 | Boal |
| 2010/0057586 A1 | 3/2010 | Chow |
| 2010/0076818 A1* | 3/2010 | Peterson ............ G06Q 30/0245 705/59 |
| 2010/0094694 A1 | 4/2010 | Shapiro |
| 2010/0106568 A1 | 4/2010 | Grimes |
| 2010/0106569 A1 | 4/2010 | Grimes |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0121726 A1 | 5/2010 | Coulter et al. |
| 2010/0121727 A1 | 5/2010 | Butler |
| 2010/0121767 A1 | 5/2010 | Coulter et al. |
| 2010/0153242 A1 | 6/2010 | Preston et al. |
| 2010/0161379 A1 | 6/2010 | Bene et al. |
| 2010/0161404 A1 | 6/2010 | Taylor et al. |
| 2010/0161457 A1 | 6/2010 | Katz et al. |
| 2010/0174607 A1 | 7/2010 | Henkin et al. |
| 2010/0174623 A1 | 7/2010 | McPhie et al. |
| 2010/0191594 A1 | 7/2010 | White et al. |
| 2010/0250338 A1 | 9/2010 | Banerjee et al. |
| 2010/0274625 A1 | 10/2010 | Carlson |
| 2010/0274627 A1 | 10/2010 | Carlson |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2011/0016103 A1 | 1/2011 | Sivakumar et al. |
| 2011/0022424 A1 | 1/2011 | VonDerheide |
| 2011/0035278 A1 | 2/2011 | Fordyce, III et al. |
| 2011/0035280 A1 | 2/2011 | Fordyce, III et al. |
| 2011/0035288 A1 | 2/2011 | Clyne |
| 2011/0047072 A1 | 2/2011 | Ciurea |
| 2011/0087519 A1 | 4/2011 | Fordyce, III et al. |
| 2011/0087530 A1 | 4/2011 | Fordyce, III et al. |
| 2011/0087531 A1 | 4/2011 | Winters et al. |
| 2011/0087546 A1 | 4/2011 | Fordyce, III et al. |
| 2011/0087547 A1 | 4/2011 | Amaro et al. |
| 2011/0087550 A1 | 4/2011 | Fordyce, III et al. |
| 2011/0093324 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0106607 A1 | 5/2011 | Alfonso et al. |
| 2011/0106840 A1 | 5/2011 | Barrett et al. |
| 2011/0125565 A1 | 5/2011 | MacIlwaine et al. |
| 2011/0276383 A1 | 11/2011 | Heiser, II et al. |
| 2011/0288918 A1 | 11/2011 | Cervenka et al. |
| 2011/0302022 A1 | 12/2011 | Fordyce, III et al. |
| 2011/0302036 A1 | 12/2011 | Fordyce, III et al. |
| 2011/0302039 A1 | 12/2011 | Fordyce, III et al. |
| 2012/0041808 A1 | 2/2012 | Hofer et al. |
| 2012/0078817 A1 | 3/2012 | Hunt et al. |
| 2012/0109709 A1 | 5/2012 | Fordyce, III et al. |
| 2012/0109734 A1 | 5/2012 | Fordyce, III et al. |
| 2012/0150601 A1 | 6/2012 | Fisher |
| 2012/0185315 A1 | 7/2012 | VonDerheide et al. |
| 2012/0191525 A1 | 7/2012 | Singh et al. |
| 2012/0215610 A1 | 8/2012 | Amaro et al. |
| 2012/0284081 A1* | 11/2012 | Cheng ................... G06Q 30/02 705/7.29 |
| 2013/0124298 A1 | 5/2013 | Li et al. |
| 2013/0191195 A1 | 7/2013 | Carlson et al. |
| 2013/0191213 A1 | 7/2013 | Beck et al. |
| 2013/0238413 A1 | 9/2013 | Carlson et al. |
| 2013/0282437 A1* | 10/2013 | Cooke ................. G06Q 30/0224 705/7.31 |
| 2013/0325587 A1* | 12/2013 | Kothari ............. G06Q 30/0243 705/14.42 |
| 2014/0067369 A1 | 3/2014 | Stavrianou et al. |
| 2014/0207716 A1 | 7/2014 | Hsu et al. |
| 2014/0310086 A1 | 10/2014 | Fordyce et al. |
| 2014/0365301 A1 | 12/2014 | Rappoport et al. |
| 2015/0339759 A1 | 11/2015 | Pope et al. |
| 2016/0148175 A1 | 5/2016 | Ovick |

FOREIGN PATENT DOCUMENTS

| | | |
|---|---|---|
| JP | 2003108897 | 4/2003 |
| JP | 2006301866 | 11/2006 |
| JP | 2007102340 | 4/2007 |
| JP | 2007317209 | 12/2007 |
| KR | 1020000037128 | 7/2000 |
| KR | 20020074271 | 9/2002 |
| KR | 20030080797 | 10/2003 |
| KR | 20040040253 | 5/2004 |
| KR | 20040107715 | 12/2004 |
| KR | 1020050024746 | 3/2005 |
| KR | 1020070043329 | 4/2005 |
| KR | 20050078135 | 8/2005 |
| KR | 20050089523 | 9/2005 |
| KR | 20060034983 | 4/2006 |
| KR | 20060095895 | 9/2006 |
| KR | 20070030415 | 3/2007 |
| KR | 20070070588 | 7/2007 |
| KR | 20070075986 | 7/2007 |
| KR | 100761398 | 9/2007 |
| KR | 20070088955 | 12/2007 |
| KR | 20080104398 | 12/2008 |
| KR | 100883700 | 2/2009 |
| KR | 1020090016353 | 2/2009 |
| KR | 1020090059922 | 6/2009 |
| WO | 9922328 | 5/1999 |

(56) References Cited

FOREIGN PATENT DOCUMENTS

| | | |
|---|---|---|
| WO | 9950775 | 10/1999 |
| WO | 0060435 | 10/2000 |
| WO | 0062231 | 10/2000 |
| WO | 0137183 | 5/2001 |
| WO | 0139023 | 5/2001 |
| WO | 0157758 | 8/2001 |
| WO | 0186378 | 11/2001 |
| WO | 0193161 | 12/2001 |
| WO | 0205116 | 1/2002 |
| WO | 0214985 | 2/2002 |
| WO | 0219229 | 3/2002 |
| WO | 0242970 | 5/2002 |
| WO | 02071187 | 9/2002 |
| WO | 03025695 | 3/2003 |
| WO | 03043333 | 5/2003 |
| WO | 03081376 | 10/2003 |
| WO | 2005001631 | 1/2005 |
| WO | 2005031513 | 4/2005 |
| WO | 2005076181 | 8/2005 |
| WO | 2006028739 | 3/2006 |
| WO | 2006126205 | 11/2006 |
| WO | 2007131258 | 11/2007 |
| WO | 2007136221 | 11/2007 |
| WO | 2008013945 | 1/2008 |
| WO | 2008023912 | 2/2008 |
| WO | 2008028154 | 3/2008 |
| WO | 2008052073 | 5/2008 |
| WO | 2008055217 | 5/2008 |
| WO | 2008064343 | 5/2008 |
| WO | 2008067543 | 6/2008 |
| WO | 2008121286 | 10/2008 |
| WO | 2008144643 | 11/2008 |
| WO | 2010017247 | 2/2010 |
| WO | 2010141270 | 12/2010 |
| WO | 2011017613 | 2/2011 |

OTHER PUBLICATIONS

Carini, Robert, "Oracle's Complete Sell-Side E-Commerce Solution," Apr. 30, 2008, 20 pages, available at http://www.oracle.com/us/products/applications/siebel/self-service-ebilling/038547.pdf.
Cashmore, Pete, "YouTube Ads: YouHate Em," available at http://mashable.com/2009/04/05/youtube-ads-youhate-em/#, Apr. 5, 2009.
CardSelect International Prepares for Launch of Customized Loyalty Platform for Credit Cards. Business Editors. Business Wire [New York] Apr. 5, 2001: 1.
Georgiadis, Margo et al., "Smart data, smart decisions, smart profits: the retailer's advantage," 22 pages, Feb. 8, 2005. Available at http://web.archive.org/web/20050208141921/http://www.mckinsey.com/practices/retail/knowledge/articles/smartdatasmartdecisions.pdf.
Google ad words Tracking Codes"—Measuring Your Profits, AdWords Help. Google Corporation—Book Excerpt, pp. 1-2. Retrieved from the Internet by Third Party Jun. 20, 2011: <URL: href="http://adwords.google.com/supportlawlbin/answer.py?hl=en& answer=146309.
International Patent Application PCT/US2011/037769, International Search Report and Written Opinion, Jan. 9, 2012.
International Patent Application PCT/US12/22417, International Search Report and Written Opinion, Aug. 9, 2012.
International Patent Application PCT/US2009/052766, International Search Report and Written Opinion, Mar. 11, 2010.
International Patent Application PCT/US2010/036076, International Search Report & Written Opinion, Dec. 30, 2010.
International Patent Application PCT/US2010/043440, International Search Report and Written Opinion, Feb. 24, 2011.
International Patent Application PCT/US2010/044449, International Search Report and Written Opinion, Mar. 14, 2011.
International Patent Application PCT/US2010/044459, International Search Report and Written Opinion, Mar. 28, 2011.
International Patent Application PCT/US2010/044706, International Search Report and Written Opinion, Mar. 25, 2011.
International Patent Application PCT/US2010/044779, International Search Report and Written Opinion, Mar. 31, 2011.
International Patent Application PCT/US2010/044786, International Seach Report and Written Opinion, Mar. 17, 2011.
International Patent Application PCT/US2010/045082, International Search Report and Written Opinion, Feb. 28, 2011.
International Patent Application PCT/US2010/050504, International Seach Report and Written Opinion, Apr. 21, 2011.
International Patent Application PCT/US2010/050923, International Seach Report and Written Opinion, Apr. 26, 2011.
International Patent Application PCT/US2010/051262, International Search Report and Written Opinion, May 30, 2011.
International Patent Application PCT/US2010/051490, International Search Report and Written Opinion, Apr. 21, 2011.
International Patent Application PCT/US2010/051853, International Seach Report and Written Opinion, Jun. 21, 2011.
International Patent Application PCT/US2010/052070, International Search Report and Written Opinion, May 31, 2011.
International Patent Application PCT/US2010/053061, International Search Report and Written Opinion, May 30, 2011.
International Patent Application PCT/US2012/031171, International Search Report and Written Opinion, Oct. 12, 2012.
Li, Wen-Syan, "Knowledge Gathering and Matching in Heterogeneous Databases," Working Notes of the AAAI Spring Symposium on Information Gathering, pp. 116-1216, Mar. 27, 1995.
Loyalty Solutions—Issuing Rewards Services 2008, First Data Corporation. Available at http://www.firstdata.com/downloads/marketing-fs/fd_issuingrewards_ss.pdf.
Mielikäinen, Taneli, "Privacy Problems with Anonymized Transaction Databases," 7th International Conference on Discovery Science, pp. 219-229, Oct. 2, 2004.
Now You Can Bump iPhones to Connect on Facebook, Twitter and LinkedIn Mashable, Feb. 8, 2011.
Operating Rules Women, Infants and Children (WIC) Electronic Benefits Transfer (EBT), Dec. 21, 2010.
Punj, Girish et al. "Cluster Analysis in Marketing Research: Review and Suggestions for Application," Journal of Marketing Research, vol. 20, pp. 134-148, May 1983.
PayPal on Android Lets You Bump Phones to Send Money, by Sarah Perez, Aug. 6, 2010.
Scotiabank Announces Its First All-in-One Card: Integrating Smart Chip Technologies' Loyalty with Credit, Debit, and Micropayments on a Single Smart Card/ PR Newswire [New York]Jul. 31, 2001: 1.
Shermach, Kelly. Coalition Loyalty Programs: Finding Strength in Numbers. Card Marketing 53 (Apr. 2001 ): 1, 12+.
Van Grove, Jennifer, "Are Your Online Video Ads Driving Actual Offline Purchases?", available at http://mashable.com/2009/05/18/video-impact/#, May 18, 2009.
WIC EBT Imp Guide, Oct. 22, 2010.

\* cited by examiner

SYSTEMS AND METHODS OF NATURAL LANGUAGE PROCESSING AND STATISTICAL ANALYSIS TO IDENTIFY MATCHING CATEGORIES

RELATED APPLICATIONS

The present application claims the benefit of the filing date of Prov. U.S. Pat. App. Ser. No. 62/154,973, filed Apr. 30, 2015 and entitled "Systems and Methods to Identify Matching Categories based on Natural Language Processing and Statistical Analysis", the entire disclosure of which application is hereby incorporated herein by reference.

The present application is related to U.S. Pat. App. Pub. No. 2014/0365301, and entitled "Systems and Methods to Generate Offers based on Transaction Data", the entire disclosure of which application is hereby incorporated herein by reference.

FIELD OF THE TECHNOLOGY

At least some embodiments of the present disclosure relate to natural language processing and statistical analyses.

BACKGROUND

U.S. Pat. App. Pub. No. 2014/0067369, entitled "Methods and Systems for Acquiring User Related Information using Natural Language Processing Techniques" and published on Mar. 6, 2014, discloses a system configured to extract, from an electronic publication, phases that are classified into one or more categories by applying natural language processing (NLP) techniques. One or more terms from the classified phrases are extracted as indicative of the information about the user.

U.S. Pat. No. 8,484,099, entitled "Method, Medium, and System for Behavior-based Recommendations of Product Upgrades", suggests the use of natural language processing techniques for identifying attributes to extract from the product-related content. For example, a product description from a manufacturer of the product can be processed via removing the stop words based on a predetermined list of words to be removed, shortening the words to their root form, filtering out brand names and marketing terms, and performing pattern matching to identify phrases as attributes.

U.S. Pat. App. Pub. No. 2015/0339759, entitled "Detecting Product Attributes Associated with Product Upgrades based on Behaviors of Users" and published on Nov. 26, 2015, discloses an attribute extractor that identifies item attributes that are common to multiple items at least partly by using natural language processing to analyze phrases included in item descriptions. The item attributes are presented in a search interface for the refinement of a search.

U.S. Pat. App. Pub. No. 2014/0207716, entitled "Natural Language Processing Method and System" and published Jul. 24, 2014, discloses natural language voice queries are analyzed by a clustering engine to identify queries in clusters. A review module is used to identify clusters determined to be useful for improving a classification system and added to the training set for new statistical models.

BRIEF DESCRIPTION OF THE DRAWINGS

The embodiments are illustrated by way of example and not limitation in the figures of the accompanying drawings in which like references indicate similar elements.

DETAILED DESCRIPTION

In one embodiment, natural language processing and statistical analysis are applied to itemized data to identify attributes that can be further analyzed to generate profiles for targeting offers based on matching categories.

Figure 1:
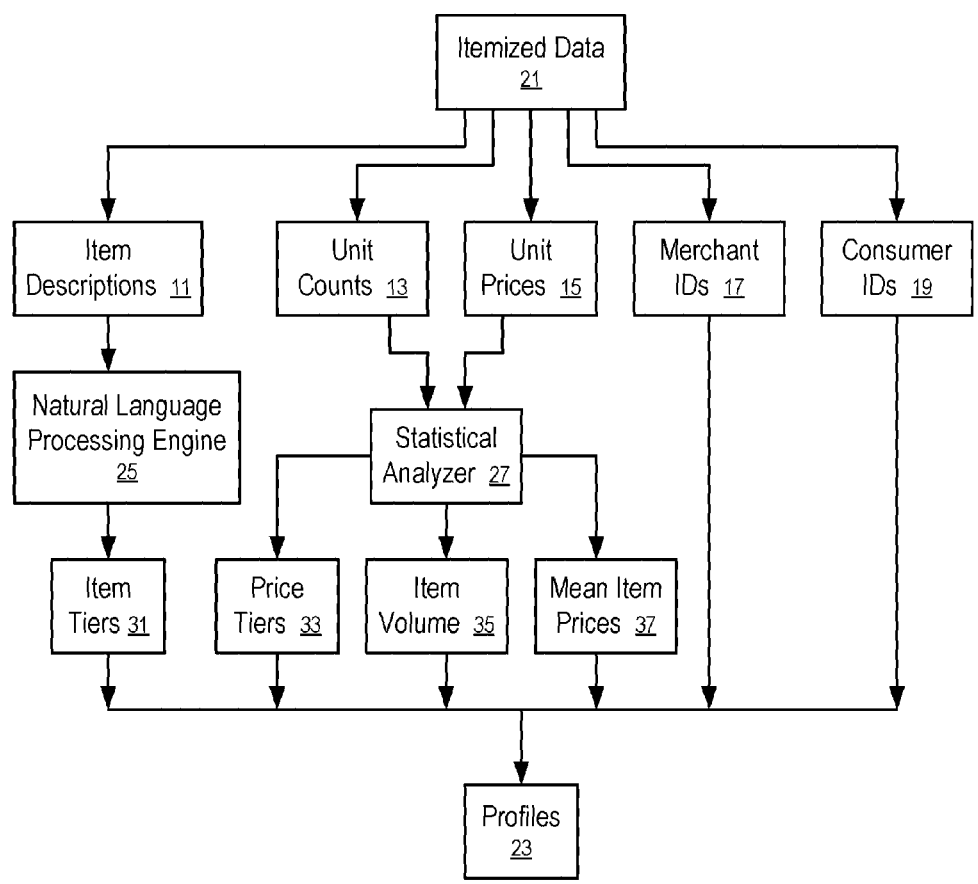
FIG. 1 illustrates a system to use natural language processing and statistical analysis to generate data for profiling according to one embodiment.

FIG. 1 illustrates a system to use natural language processing and statistical analysis to generate data for profiling according to one embodiment.

In FIG. 1, itemized data (21) includes data fields such as item descriptions (11), unit counts (13), unit prices (15), merchant identifications (17), and customer identifications (19).

A natural language processing engine (25) is configured to process the item descriptions (11) to identify item tiers (31) of the corresponding items described in the item descriptions (11).

The item descriptions are natural language descriptions that are generally configured for presentation to human readers for consideration.

In one embodiment, the natural language processing engine (25) is configured to process and interpret the item descriptions to classify the corresponding items into different tiers (e.g. high-end products, mid-tier products, low-end products, etc.).

For example, the natural language processing engine (25) of one embodiment is configured to filter from the item descriptions (11) words that may not be relevant to the indication of the tiers of items. For example, stop words identified in a predetermined list of words to be removed from the item descriptions (11) without filtering out brand names and marketing terms, before further processing the filtered item descriptions. For example, the natural language processing engine (25) can be configured to perform pattern matching of words to remove portions of descriptions not relevant to the tiers of the items. For example, the natural language processing engine (25) can be configured to score the tiers of the items based on the presence in the item description certain keywords that have predetermined weights towards the tier scores of keywords on a predetermined keyword list.

In some embodiments, a training set of item descriptions and their item tiers determined by human representatives are used established a classification model. For example, a user interface is provided to present the item descriptions in the training set to one or more human operators and receive input from the human operators their tier ratings of the items as described by the item descriptions in the training set. The ratings may be selected from a predetermined list of rating candidates (e.g., a high-end product, a mid-tier product, a low-end product). Alternatively, the ratings may be in the form of a numerical score (e.g., a number between 1 to 5, with a lower number indicative of a lower end product, and a higher number indicative of a higher end product). For example, the customers who have purchased the items described by the item descriptions may be prompted via a user interface implemented on a website or a mobile application to provide a feedback to rate the tiers of the items. For example, a crowd source site can be used to request people on the internet to rate the items described by the respective descriptions. The training set of item descriptions and their item tiers determine by human representatives can be used to train a predictive model using any machine learning technique. Alternatively and/or in combination, a close match between a given item description with an item description in the training set (e.g., based on a threshold distance between document vectors of item descriptions in a document space) can cause the natural language processing engine (25) to assign the item tier of the closest item description in the training set to the given item description. In some embodiments, when a classification confidence level as determined by the natural language processing engine (25) is determined to be below a threshold for a given item description, the item description is presented to one or more human representatives to receive their classification input. The result can be combined into the training set so that the capability of the natural language processing engine (25) is improved over a period of time.

The training set of item descriptions may be pre-filtered (e.g., based on known patterns and/or stop words) to simplify the input for training the predictive model for the item tier classification. Alternatively or in combination, the training set can also be used to establish a predictive model of stop words and/or patterns that are not indicative of tier levels of the respective items; and subsequently, the stop words and/or patterns can be used to filter the item descriptions (11) to generate inputs for the natural language processing engine (25).

In FIG. 1, a statistical analyzer (27) is configured to perform a statistical analysis of the unit counts (13) and unit prices (15) to determine the mean prices (37) of items, item volumes (35), and the price tiers (33).

For example, an identical (or similar) product (e.g., as identifying by a Universal Product Code (UPC), a stock keeping unit (SKU), an item description) may be sold by different merchants at different prices, and sold by the same merchant during different time periods. From the itemized data (21) of different merchants and/or different time periods, a mean price (37) can be computed for the product (or similar products). The mean price (37) of merchants selling a product can be compared to the mean price (37) of a particular merchant selling the product to determine a price tier (33) of the particular merchant. The mean price (37) can be compared to the unit price (15) to determine a price tier (33) of a particular purchase transaction. For example, a first price tier can be used to label a paid price having a significant premium over the mean price (37); a second price tier can be used to label a paid price that is close to the mean price (37); a third price tier can be used to label a paid price having a deep discount over the mean price (37)). In some embodiments, the price tiers (33) are selected from predetermined categories based on threshold ranges relative to the mean prices (37); and in other embodiments, the price tiers (33) are numerical numbers representing the ratio between the unit price (15) and the mean prices (37), or the ratio between the mean prices (37) of a set of merchants and the mean price (37) of a merchant in the set.

In one embodiment, the numbers of units of a product sold by a specific merchant is tallied by the statistical analyzer (27) over purchase transactions as the item volume (35) of the merchant. The item volume (35) of the merchant can be further compared with the item volumes (35) of other merchants selling the same product to determine an item volume tier of the merchant. For example, the merchant can be classified as a large seller of the product, a median seller of the product, or a small seller of the product. Alternatively, the item volume tier of a merchant selling a product can be characterized by a numerical number indicative of a ratio between the item volume (35) of the merchant selling a product and the median item volume of merchants selling the product.

In general, an item sold by different merchants may be described using different item descriptions (11) in the itemized data. The median or average item tier of the item (e.g., weighted using item volume (35) of the respective merchants selling the item) can be compared to the item tiers of the respective merchants to identify tier modifiers of the merchants. For example, a merchant having an item tier evaluated to be higher than the median/average item tier can be assigned with a modifier indicating that the items are sold by the merchant at an elevated tier. Similarly, a merchant having an item tier evaluated to be lower than the median/average item tier can be assigned with a modifier indicating that the items are sold by the merchant at a depressed tier.

The attributes extracted by the natural language processing engine (25) and the statistical analyzer (27), such as the item tiers (31), price tiers (33), item volumes (35), mean item prices (37), etc. can be aggregated and/or combined to generate the profiles of the merchants and customers identified by the merchant identifications (17) and the consumer identifications (19).

The tier attributes can be aggregated at different levels, such as a product level, a product category/merchant category level, and a merchant level. For example, item tiers determined from the description of a product sold by a merchant can be aggregated or combined across the volume of the product sold by the merchant to generate an item tier for the product at the product level. Further, the item tiers for different products sold by the merchant within a product category/merchant category can be aggregated or combined across the volume of the products sold by the merchant in the category to generate an item tier for the products in the category at the category level. Furthermore, the item tiers for product categories/merchant categories of the merchant can be aggregated or combined across the volume of the products sold by the merchant to generate an item tier for the merchant at the merchant level. Price tiers and/or the volume tiers can also be aggregated or combined at corresponding levels in similar ways.

The aggregation or combination can be performed in the form of a weighted average where the respective sales volumes of the relevant products are used as the weights.

In one embodiment, a combination of the natural language processing of product descriptions and statistical analysis of payment data to classify consumers based on products purchased and merchants based on products sold. Systems and methods use natural language processing techniques to interpret the descriptions of item level purchase data in classifying products that have been purchased by customers into micro-categories. Statistical deviation methods are applied to the payment data to calculate normalized mean product cost, after removing outliers. After determining the micro-categories of the products purchased and the mean product cost of the purchased products, the system and methods classify consumers and merchants into categories based at least in part on the product micro-categories, mean costs, and relative volume of product types sold by merchants to predict which consumers are likely to purchase from which merchants. Thus, targeted offers from selected merchants can be provided to customers who are likely to use the offers.

The techniques disclosed herein can be used to systematically target consumers with relevant offers using product level data.

For example, product level data of items involved in purchases, such as Stock Keeping Unit (SKU) or Universal Product Code (UPC), are collected and stored in association with payment transaction data. The systems and methods disclosed herein meaningfully group together both seemingly unrelated consumers and seemingly unrelated merchants for specific product types, based on the natural language analysis of the description, the meaning prices of products involved in the payment transactions, the price characteristics of the products involved in the payment transactions of the customers and merchants, and the volumes of the categories of products sold by the merchants.

The derived information allows categorizing of the customers and merchants to match customers with merchants from which the customers are likely to make purchases. For example, to launch offers products the systems and methods to determine the attributes of the merchants and customers based on natural language processing and statistical analysis can be used in a system for automated offer generation as described in U.S. Pat. App. Pub. No. 2014/0365301, entitled "Systems and Methods to Generate Offers based on Transaction Data", the disclosure of which is hereby incorporated herein by reference.

Figure 2:
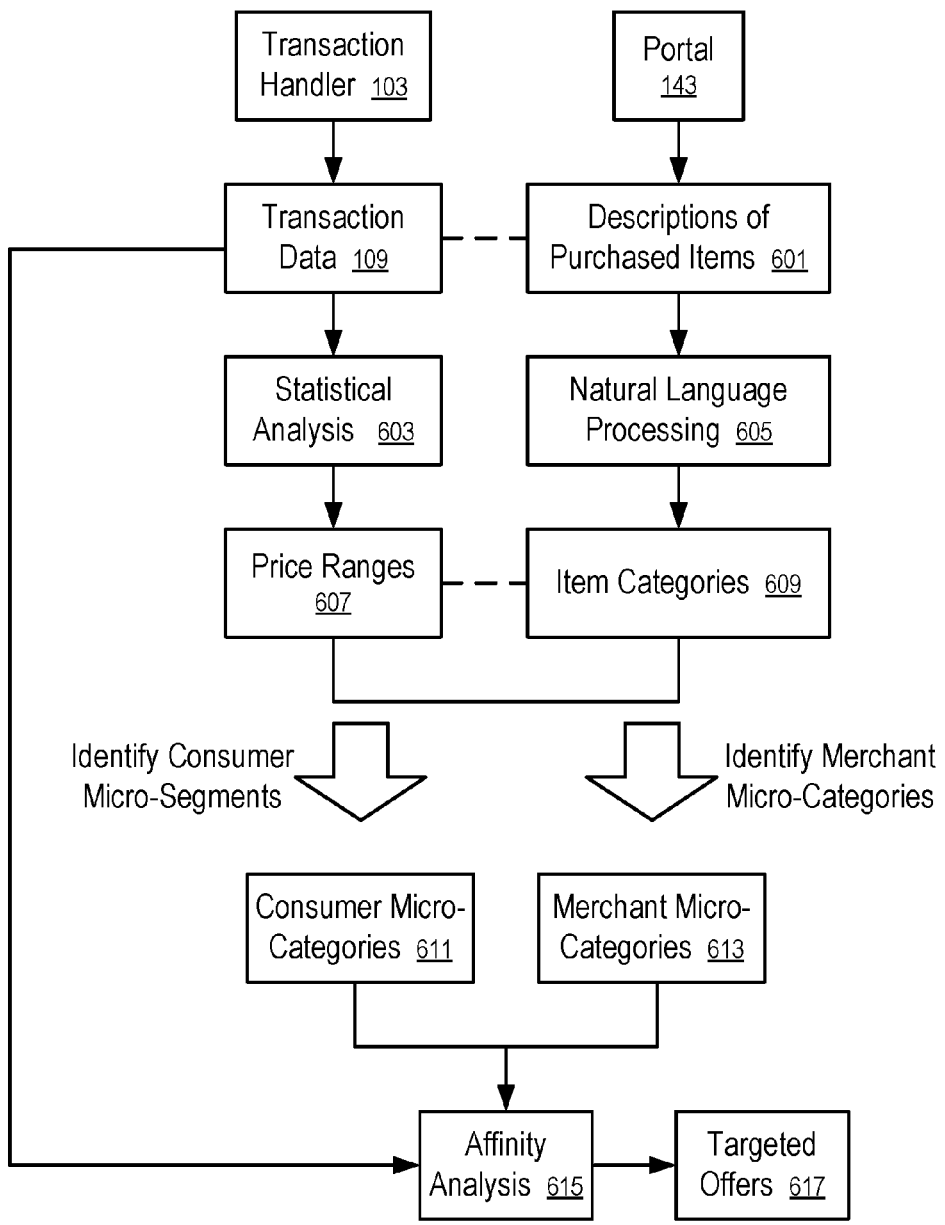
FIG. 2 shows a system configured to use natural language processing and statistical analysis to match micro-segments of merchants and customers according to one embodiment.

FIG. 2 shows a system configured to use natural language processing and statistical analysis to match micro-segments of merchants and customers according to one embodiment.

Figure 8:
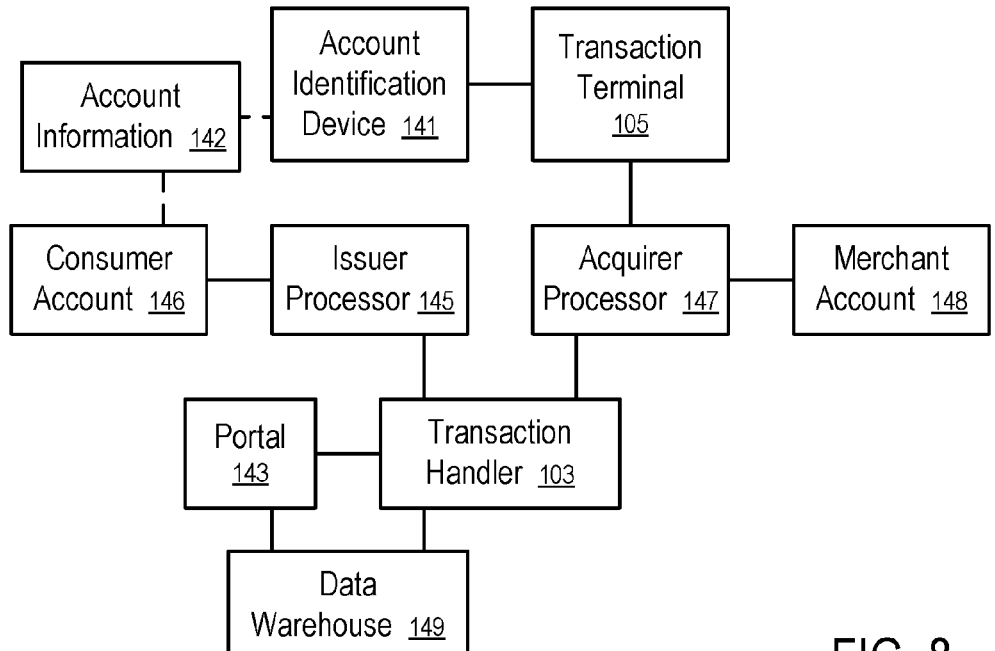
FIG. 8 shows a system to provide information based on transaction data according to one embodiment.

In FIG. 2, the system uses the transaction data (109) generated by the transaction handler (103) for the payment transactions between merchants and their customers (e.g., processed in an electronic payment processing network in a way as illustrated in FIG. 8).

In FIG. 2, the system also uses the description of the items (601) that are purchased via the payments corresponding to the payment transactions recorded in the transaction data (109). For example, the portal (143) may obtain the item level purchase data from the transaction terminals (e.g., 105) of the merchants via an Internet connection during or after the processing of the payment transactions as recorded in the transaction data (109). In some embodiments, the transaction terminals may include the item level purchase data in authorization requests transmitted in the electronic payment processing network for the authorization of the respective payment transactions.

For example, the item level purchase data may include a code identify a particular item purchase, such as Stock Keeping Unit (SKU) or Universal Product Code (UPC). Using the code the system can look up from a database a human-readable description of the product in the form of a text string.

A computing device of the system is configured to perform natural language processing (605) of the descriptions of the purchased items (601) to classify the purchased items into categories. The use of natural language processing techniques currently known in the field (and similar techniques that may be further developed in the future) allows the computing device to classify the products into categories in an automated way. Thus, similar products can be classified into the same category, even though there are variations in the descriptions of the purchased items (601). Further, natural language processing (605) can be configured to assign each product into a product tier, such as a high-end product, a mid-tier product, a low-end product. The characterization of the product tiers can be determined based on the natural language processing (605) of the description in a way a person interpret the description of the product to characterize the product.

In one embodiment, the natural language processing (605) of the descriptions of purchased items (601) assigns item categories (809) to the purchased items based on the machine interpretation of the descriptions.

In one embodiment, the items level purchase data also includes the prices paid for the individual items purchased via the payment transactions recorded in the transaction data (109). A statistical analysis (603) is applied to the paid prices to determine price ranges (607) of the item categories (609).

For example, a statistical deviation method can be applied to the prices of a set of items in an item category to remove price outliers and determine the mean cost of the items in the item category. The mean cost allows the system to determine whether an item involved in a payment transaction between a merchant and a customer is paid with a price consistent with the mean cost, above the mean cost and thus purchased with a price premium, below the mean cost and thus purchased with a price discount, with a high price premium, with a deep price discount, etc. Thus, mean cost can be used to drive the price attribute in terms of presence of a price premium or discount and/or the degree of a price premium or discount. Such a price attribute can be assigned to the each item involved in the payment transactions based on the statistical analysis (603).

Further, in one embodiment, the statistical analysis (603) also provides attributes characterizing the sales volumes of items in each item categories.

Figure 5:
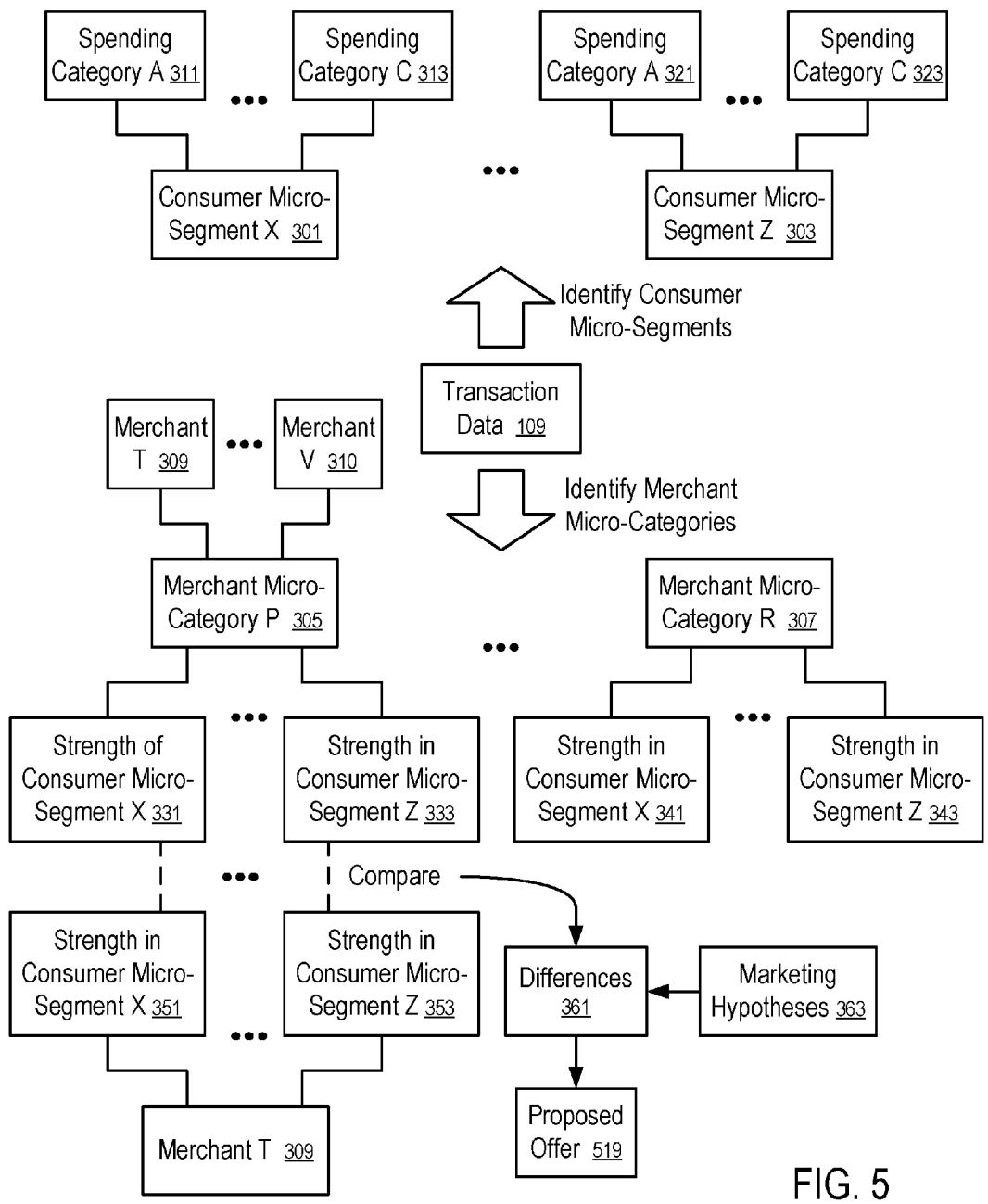
FIG. 5 shows a method to generate an offer based on transaction data according to one embodiment.
Figure 6:
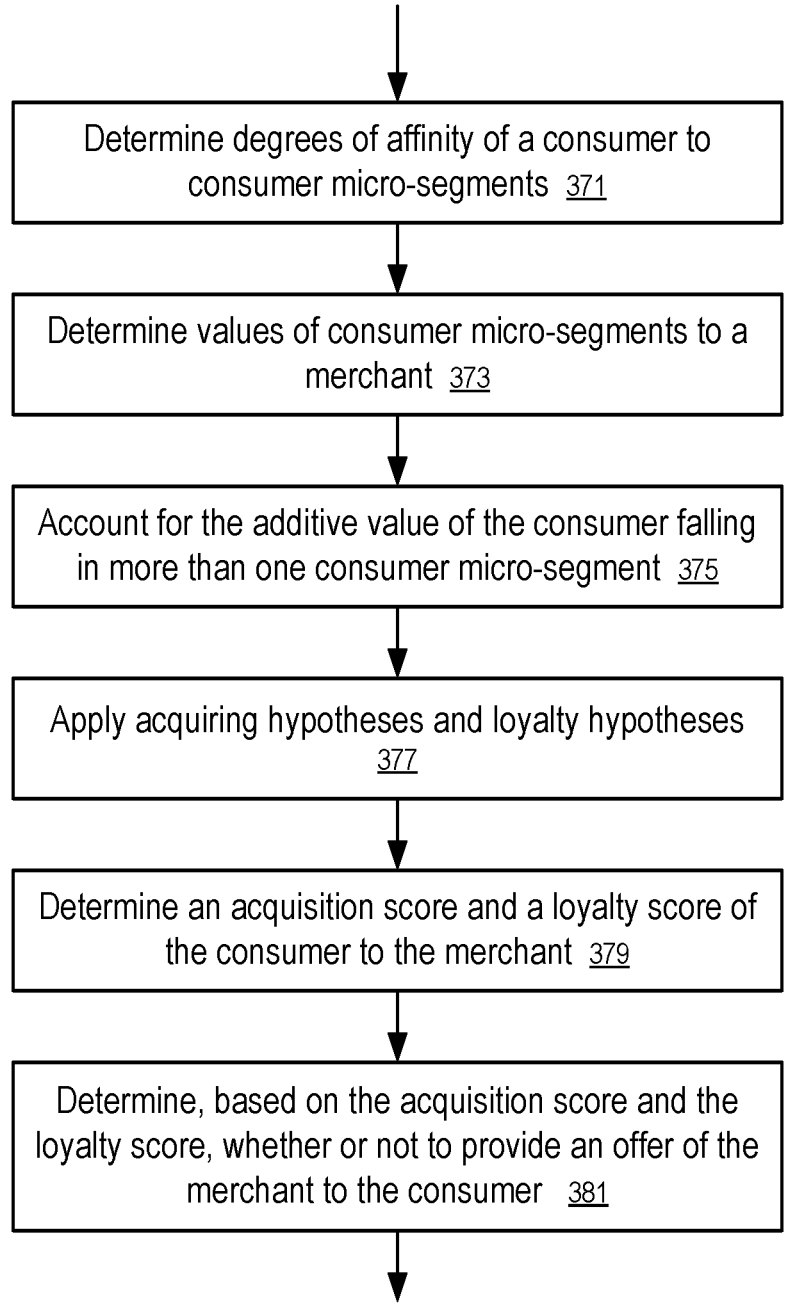
FIG. 6 shows a method to determine whether or not to provide an offer to a user according to one embodiment.
Figure 7:
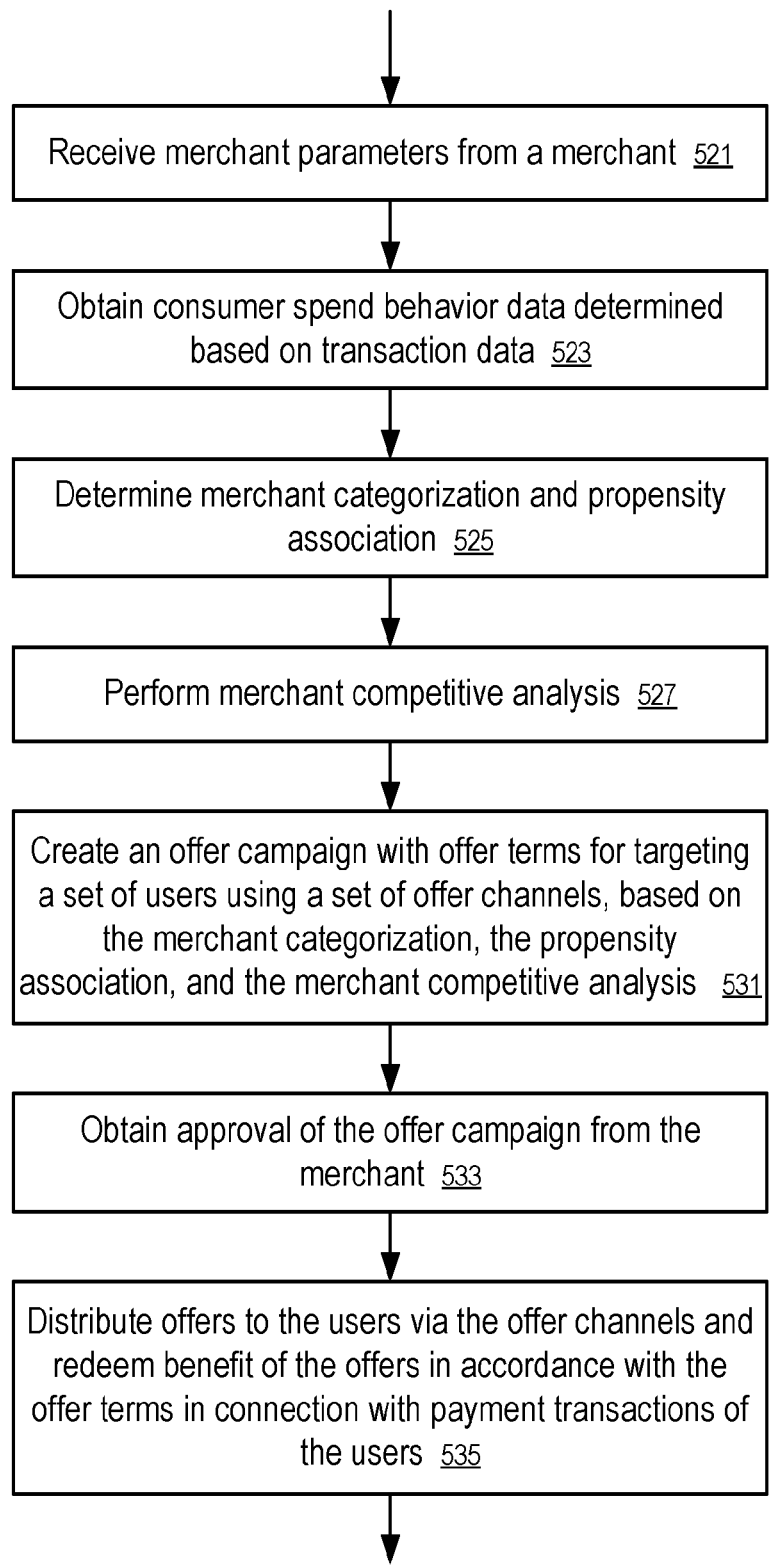
FIG. 7 shows a method to generate and execute an offer campaign based on merchant input and transaction data according to one embodiment.

In one embodiment, based at least in part on the item categories (609) determined from the natural language processing (605), and the price attributes and sales volume attributes determined from the statistical analysis (603), the computing system is configured to identify the merchant micro-categories (613) and the consumer micro-categories (611), e.g., in a way as illustrated in FIGS. 5-7.

Based on the transaction data (109), the computing system performs an affinity analysis (615) to associate consumer micro-categories with merchant micro-categories from which the consumers are likely to make purchases. For example, based on the transaction data, the computing system may calculate the affinity score of a consumer micro-category with each respective merchant micro-category (613) and rank the merchant micro-categories (613) based on the affinity scores. A threshold affinity score can be used to select a set of one or more merchant micro-categories with which the consumer micro-category has affinity scores that are higher than the threshold. Thus, the consumer micro-category is associated with the set of one or more merchant micro-categories identified via the threshold.

In some embodiments, the affinity scores may also be evaluated for individual consumers for association with respective sets of merchant micro-categories.

Based on the affinity association between customer micro-categories (611) (or the individual customers) with the merchant micro-categories (613) targeted offers from respective merchants can be generated and/or distributed to the associated customers.

For example, the system is configured to automatically and dynamically learn to identify product type roll-ups by interpreting the natural language of the product description and assign products to clustered categories.

In one embodiment, to determine product types as high-end, mid-tier, or low-end, the system also uses statistical deviation methods to determine normalized mean product costs. Mean will be normalized where variables may differ such as type of currency, geographical cost norms and account for number of units sold.

For example, the system may automatically identify (and dynamically learn to identify) a particular consumer segment (e.g., high-end+natural personal care product buyers) by clustering a high propensity of these product types to these consumers while also recognizing a low propensity of these consumers to alternative associated product types such as mid-tier cosmetic type categories. The system will also categorize consumer segments by clustering high product affinities e.g. when a consumer in segment x buys product a, there is a high likelihood she will also buy product b.

For example, the system may automatically identify (and dynamically learns to identify) merchant categories based on clustering and relative volume of product types sold. Merchants can be assigned to multiple categories so that depending on the product, distribution channel and geographic location, seemingly unrelated merchants can be identified as competitors for specific product types.

In one embodiment, consumer comparisons are based on product categories purchased, price point, sales channel, and geographic location; and merchant categorizations are based on product categories sold, price point, sales channel, and geographic location.

In one embodiment, the system automatically identifies (and dynamically learns to identify) high affinity consumer segment and product category relationships. The merchant is categorized based on products sold as well as the relative sales percent and sales revenue of each product category. The system finds competitors based on products sold and geographical opportunistic area. The system identifies the high value consumer segments from purchasing habits at competitors.

In one embodiment, the system automatically identifies (and dynamically learns to identify) consumers to be targeted based on level of consumer segment affinity. A consumer can align to more than one consumer segment. An affinity score measures the affinity of a consumer to a consumer product segment.

Figure 3:
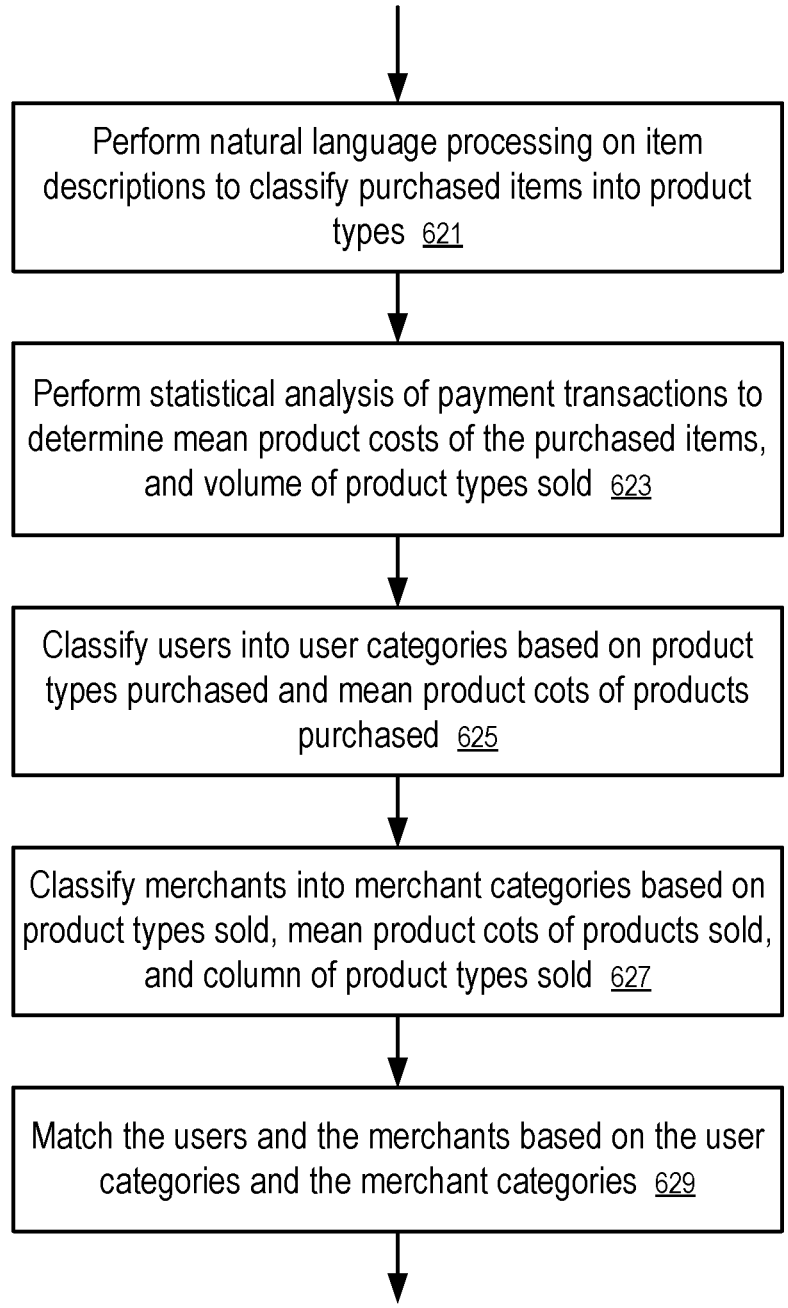
FIG. 3 shows a method to provide targeted offers based on natural language processing and statistical analysis according to one embodiment.

FIG. 3 shows a method to provide targeted offers based on natural language processing and statistical analysis according to one embodiment. For example, the method of FIG. 3 can be performed in the system of FIG. 2.

In one embodiment, a computing device is configured to: perform (621) natural language processing on item descriptions to classify purchased items into product types; perform (623) statistical analysis of payment transactions to determine mean product costs of the purchased items, and volume of product types sold; classify (625) users into user categories based on product types purchased and mean product cost of products purchased; classify (627) merchants into merchant categories based on product types sold, mean product cost of products sold, and volumes of product types sold; and match (629) the users and the merchants based on the user categories and the merchant categories.

In one embodiment, the computing device includes the transaction handler (103), the portal (143), and the offer engine (511) configured to perform the analyses and/or the identification of relevant offers (186).

In one embodiment, the computing apparatus is configured to generate offers on behalf of merchants based on a reduced set of parameters, such as budget, timing, and logo. The proposed offers include offer terms, targeted customers to whom the offers will be provided, media channels through which the offers will be distributed, and other aspects that generated based on transaction data in accordance with the reduced set of parameters.

Offer sourcing is typically a manual process. A sales force is typically assigned to work directly with merchants to determine what they need in order to generate offers that are specific to the merchants. Alternatively, the merchants may be required to define their offers using proprietary procedures that are labor intensive. Expensive offer sourcing requires a considerable amount of time from highly compensated individuals. The traditional approach of offer sourcing does not necessarily leverage economic data to predict and help ensure offer effectiveness.

In one embodiment, offer sourcing is automated via an offer engine configured to generate offers based on algorithmic models, transaction data, offer targeting history and redemption data. The offer engine can tell merchants what they need; and offers are generated based on merchant benchmarking and consumer segmentation analysis.

In one embodiment, an offer engine is configured to automatically create merchant specific offers by using payment data intelligence (e.g., transaction data (109), transaction profile (127)). Through the use of payment data intelligence, the offer engine is configured to generate optimal offer terms, target optimal set of payment card holders, and determine optimal offer delivery channels.

For example, after a merchant is onboarded to an offer ecosystem, the merchant is prompted to provide minimal information such as offer budget, timing, and logo; and based on the minimal information provided by the merchant, the offer engine is configured to automatically generate proposed offer campaigns and present the proposed offer campaigns to merchant for approval. If the merchant agrees to run the proposed offer campaign(s), the offer engine actives the offer campaign(s) for execution.

In one embodiment, the offer engine is differentiated by data and configured to automatically perform merchant benchmark analysis to determine the optimal terms of the offer(s), identify a segment of consumers to be targeted with the offer(s), and select the optimal delivery channel(s) to communicate the offer(s) to the identified segment of consumers. The offer engine is configured to generate the offers based on consumer spend behavior within and across relevant merchants and geographies.

For example, the offer engine is configured to receive input data, such as merchant parameters specified by a merchant, and consumer spend behavior data generated by the profile generator (121) based on the transaction data (109). Based on the input data, the offer engine is configured to learn new categorizations and associations, perform merchant competitive analysis, and create offers. The offer engine provides output data, such as offer terms, consumer targets, offer delivery channels, etc.

For example, Korva Gonzales, the owner of "Finnegan's Good Times Pub" would like to bring in new customers to her restaurant. She decides to subscribe to a Create-My-Offers program to help her achieve her sales goals. Korva registers on the Create-My-Offers website, where she supplies the amount she would like to invest in her offer campaign, the duration she would like to run her marketing offers, and uploads her digital business logo.

Based on the input received from Korva, the offer engine determines that the merchant "Finnegan's Good Times Pub" is in a merchant category of "casual bar and grill." The offers engine identifies, based on the transaction records of past payment transactions processed by the transaction handler, a consumer segment that includes the customers of "Finnegan's Good Times Pub" and a consumer segment that includes the consumers of the competitors of "Finnegan's Good Times Pub" that are within a geographically opportunistic area. The offer engine compares the consumer segments and identifies one or more highly profitable consumer segments that are not customers of Finnegan's Good Times Pub, but who frequent its competitors.

Nina Trudeau is one of a set of consumers the offers engine identifies as consumer targets. She patrons "Buckley's Bar & Grill" regularly after work with colleagues. Nina, along with others in her consumer segment, spends about $50 each time she eats at the competition. Nina has responded to offers in the past and the offers engine determines that she is particularly responsive to offers sent to her email. The offer engine generates offers targeted to Nina and other like consumers. She receives an email for an offer to dine at "Finnegan's Good Times Pub"—Get $50 of food for $25.

Nina suggests to her colleagues that they try a new place for when they get together after work later in the week. Nina eats at "Finnegan's Good Times Pub" with her friends and redeems her offer. She loves the food and the atmosphere and now she and her friends regularly patron "Finnegan's Good Times Pub".

The owner of "Finnegan's Good Times Pub", Korva sees immediate results in higher traffic (e.g., a 35% increase in new customers, 56% of which come back repeatedly after redeeming offers from the Create My Offers program).

The Offers Engine doesn't stop there. It knows that Nina and others redeemed their offers, and it knows who did not redeem and will use this information to optimize future offers. It also recalibrates consumer segments and merchant categories based on the latest payment transaction data to continually gain offer targeting and merchant competitive analysis precision.

In one embodiment, the offer engine is configured to automatically create merchant specific offers by analyzing payment transaction data. The offer engine is configured to generate optimal offer terms, target an optimal set of account holders of payment accounts, and identify optimal offer delivery channels.

For example, after a merchant is onboarded to the system, the merchant can specify information such as the budget, timing, and logo for the offer. The offer engine generates the offer(s) in an automated way and presents the offer(s) to the merchant for approval.

In one embodiment, the offer engine is further configured to be self-learning, based on offers redeemed via the payment processing system and the ongoing changes consumer spending patterns reflected in the payment transaction data recorded by the transaction handler of the payment processing network.

In one embodiment, the offer engine is configured to analyze information recorded by the transaction handler in the transaction data to identify consumer spend behavior. The analyzed information may include: merchant; merchant category; primary account number; transaction amount; merchant location; products purchased; consumer identifier; offer; offer Redeemed (yes/no); redemption channel (online/POS); reward type (points, % off, dollar value off, free item with qualifying purchase, etc.); reward value (amount of reward type); offer delivery channel (email, SMS, POS, online); offer delivery time/date; offer delivery trigger type (passive batch, proximity to location, purchase behavior e.g. real time card swipe, etc.); and transaction Time/Date.

To generate the offers, the offer engine is configured to receive from the merchant the merchant parameters, such as: campaign budget; campaign timeframe; and media assets (e.g., logo).

To generate the offers, the offer engine is configured to learn new categorizations and associations. For example, the offer engine is configured to: recalibrate merchant categories; recalibrate consumer segments; perform propensity association of merchant categories to consumer segments; perform propensity association of next most likely merchant category to consumer segments; perform propensity association of offer terms to consumer segments; perform propensity association of offer timing to consumer segments; perform propensity association of offer delivery channel to consumer segments; perform propensity association of offer redemption channels to consumer segments; and perform propensity association of offer trigger responses to consumer segments.

To perform merchant competitive analysis for the generation of offers, the offer engine is configured to identify: consumers segments that comprise competitor merchants' sales; consumers segments that comprise client merchant sales; geographical client merchant opportunity; ticket size distribution by consumer segments at competitor merchants; consumers segments that comprise competitor merchandise/service sales; consumers segments that comprise competitor client merchandise/service; geographical client merchant opportunity at merchandise/service level; sales revenue concentration by consumer segments; and client and competitor consumer segment gap analysis.

To create offers, the offer engine is configured to: create offer terms; determine offer targeting; and identify offer delivery channels.

In one embodiment, the offer engine is configured based on algorithmic models to automatically generate merchant specific offers, based at least one payment transaction data. The offer terms are generated based on greatest likelihood to attract new customers and/or increase existing customer spend for merchants. As part of offer generation, an optimal target set of consumers are associated to the offer along with ideal delivery channels.

Leveraging accumulated payment transaction data across merchants and consumers, the offer engine is configured in one embodiment to: automatically perform merchant benchmarking to determine sales performance against competitors, e.g., ticket size distribution, time of year, time of day; categorize and segment the consumer base that constitutes merchant sales performance at merchant and competitors; categorize and segment the consumer base living in merchant vicinity; generate offer terms based on sale performance benchmarking and consumer analysis; generate optimal consumer target set based on consumer segment and merchant sales analysis; and determine optimal delivery channel(s) based on merchant category and consumer segment analysis.

The use of the offer engine can reduce the high cost of offer aggregators sending out a sales force to manually generate offers with merchants. Based on the transaction data and redemption data about offers redeemed by consumers, the offer engine can generate more effective offers and greatly simplify merchant's offer sourcing process. Consumers can receive more relevant offers and have reduced marketing noise.

Figure 4:
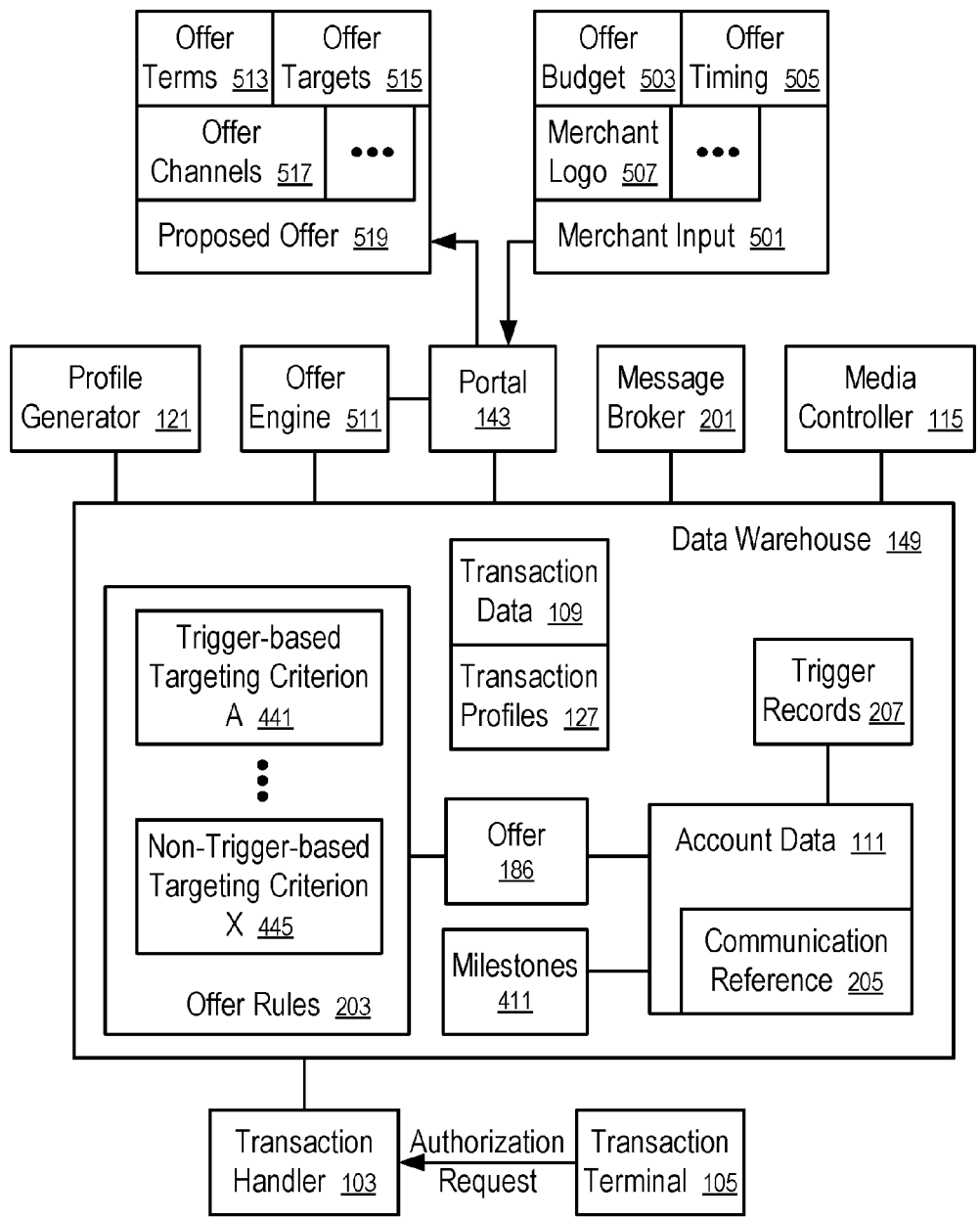
FIG. 4 shows a system to generate offers based on merchant input and transaction data according to one embodiment.

FIG. 4 shows a system to generate offers based on merchant input and transaction data according to one embodiment. In FIG. 4, a profile generator (121) is configured to generate transaction profiles (127) that characterize consumer spend behaviors discussed above, based on transaction data (109) stored in the data warehouse (149) for the transactions processed by the transaction handler (103).

In FIG. 4, the portal (143) is configured to present a user interface to receive the merchant input (501), such as offer budget (503), offer timing (505), merchant logo (507), etc.

Based on the consumer spend behaviors and the merchant input (501), the offer engine (511) is configured to perform categorization and associations for the business of the merchant, to perform competitive analysis, and to create proposed offers (519), including the identification of aspects such as offer terms (513), offer targets (515), offer channels (517), etc.

In FIG. 4, the portal (143) is configured to present a user interface to allow the merchant to review the proposed offer (519) and selectively approve the campaign to run the approved offer (186). The user interface may optionally allow the merchant to manually adjust the proposed offer (519) that is generated by the offer engine (511).

After the proposed offer (519) is approved by the merchant for distribution, the system illustrated in FIG. 4 is configured to communicate the approved offer (186) to the users using the communication references (e.g., 205) associated with the account data (e.g., 111) of the users, associate the offer (186) with the account data (e.g., 111), and redeem the benefit of the offer (186) for the users in connection with the payment transactions of the users. For example, the portal (143) may generate the trigger records (207) based on the offer rules (203), such as trigger-based targeting criterion (441) and/or non-trigger-based targeting criterion (445) to detect transactions that meet the benefit redemption requirements of the offer (186). When the redemption requirements of the offer (186) require more than one payment transactions, the data warehouse (149) stores the milestones achieved via user actions/transactions that meet the requirement of the offer rules (203).

In one embodiment, in generating the proposed offer (519), the offer engine (511) identifies the offer targets (515) and/or the offer terms (513) based on a merchant and consumer benchmark analysis.

In one embodiment of a merchant and consumer benchmark analysis, the offer engine (511) and/or the profile generator (121) determines consumer segmentations based on spending patterns in transaction data (109) and merchant categorizations based on purchase patterns in the transaction data (109), in a way as discussed below in connection with FIG. 5.

In one embodiment of the identification of the offer targets (515), the offer engine (511) and/or the profile generator (121) performs consumer scoring for offer targeting in a way as discussed below in connection with FIG. 6.

FIG. 5 shows a method to generate an offer based on transaction data according to one embodiment.

In one embodiment, the offer engine (511) and/or the profile generator (121) is configured to perform automated cluster analysis of the transaction data (109) to identify consumer micro-segments (301, . . . , 303). For example, the cluster analysis may be identified based on unaware associations, or other cluster analysis techniques. The cluster analysis is performed based on the transaction parameters, such as merchant category code, transaction amount, merchant location, transaction time and date, etc. in the transaction data (109) of users. As a result of the cluster analysis of consumer micro-segments (301, . . . , 303), different consumer micro-segments (301, . . . , 303) are identified to be associated with different levels of spending categories (e.g., 311, . . . , 313), which represent the spending behavior of the users in the respective consumer micro-segments (301, . . . , 303).

For example, one consumer micro-segment (e.g., 301) may have levels of spending categories (e.g., 311, . . . , 313) that indicate spending preferences in high-end restaurant, frequent taxi, frequent travel, high-end grocery, frequent spa, high-end jewelry store, high end child care, high-end bicycle shop, etc.; and another consumer micro-segment (e.g., 303) may have levels of spending categories (e.g., 311, . . . , 313) that indicate spending preferences in low-end restaurant, car repair, pawn shop, mid-tier grocery, pet shop, bowling alley, towing services, package store, etc.

In one embodiment, the offer engine (511) and/or the profile generator (121) is configured to perform automated cluster analysis of the transaction data to identify merchant micro-categories (305, . . . , 307). For example, the cluster analysis is performed based on the clustering of consumer micro-segments that patron each merchant and incorporating the relative merchant ticket size distribution. As a result of the cluster analysis of merchant micro-categories (305, . . . , 307), different merchant micro-categories (305, . . . , 307) are identified to be associated with different strength levels of consumer micro-segments (e.g., 331, . . . , 333) which represent the customer patterns of the merchants in the respective merchant micro-categories (305, . . . , 307).

In one embodiment, the merchant micro-categories (e.g., 305, . . . , 307) are identified with each merchant category code.

In one embodiment, the merchant micro-categories (e.g., 305, . . . , 307) are identified further based on ticket size distribution. A ticket size identifies a total transaction amount in a single payment transaction.

For example, one merchant micro-category (e.g., 305) may have a first set of consumer micro-segments and have a first ticket distribution pattern; and another merchant micro-category (e.g., 307) may have a second set of consumer micro-segments and have a second ticket distribution pattern.

In the example illustrated in FIG. 5, the merchant micro-category P (305) is determined via the cluster analysis to include a set of merchants (309, . . . , 310).

In FIG. 5, to generate a proposed offer (519) for a merchant T (309) which is in the merchant micro-category P (305), the offer engine (511) and/or the profile generator (121) determines the strength levels of consumer micro-segments (e.g., 331, . . . , 333) of the merchant T (309) and the ticket distribution of pattern of the merchant T (309), for comparison with the corresponding attributions of the merchant micro-category P (305).

In FIG. 5, the offer engine (511) is configured to compare the attributes of the merchant micro-category P (305), in which the merchant T (309) is a member, with the corresponding attributes of the merchant T (309) to identify the differences (361).

For example, the strengths (331, . . . , 333) of consumer micro-segments of the merchant micro-category P (305) are compared with the strengths (351, . . . , 353) of the corresponding consumer micro-segments of the merchant T (309). The ticket distribution pattern of the merchant micro-category P (305) is compared with the ticket distribution pattern of the merchant T (309).

In FIG. 5, the offer engine (511) is configured to apply marketing hypotheses (363) to the differences (361) to generate the proposed offer (519). Thus, the proposed offer (519) can be generated in an automated way for approval by the merchant T (309).

For example, when the strength of the micro-segment X (301) of the merchant T (309) is substantially lower than the strength of the micro-segment X (301) of the merchant Micro-Category P (305) in which the merchant T (309) is a member, the offer engine (511) may generate the proposed offer (519) to target increasing the micro-segment X (301) for the merchant T (309).

In one embodiment, a strength of each respective consumer micro-segment of a merchant is proportional to a ratio between customers of the merchant in the respective consumer micro-segment and total customers of the merchant.

FIG. 6 shows a method to determine whether or not to provide an offer to a user according to one embodiment.

In FIG. 6, the offer engine (511) and/or the profile generator (121) is configured to determine (371) degrees of affinity of a consumer to consumer micro-segments (301, . . . , 303), determine (373) values of consumer micro-segments (301, . . . , 303) to a merchant (e.g., 309), account for (375) the additive value of the consumer falling in more than one consumer micro-segment (301, . . . , 303), apply (377) acquiring hypotheses and loyalty hypotheses to determine (379) an acquisition score and a loyalty score of the consumer to the merchant (309), and determine (381), based on the acquisition score and the loyalty score, whether or not to provide an offer (186 or 519) of the merchant (309) to the consumer.

FIG. 7 shows a method to generate and execute an offer campaign based on merchant input and transaction data according to one embodiment.

In FIG. 7, a computing system is configured to: receive (521) merchant parameters (e.g., merchant input (501)) from a merchant; obtain (523) consumer spend behavior data (e.g., transaction profile (127)) determined based on transaction data (109); determine (525) merchant categorization and propensity association; perform (527) merchant competitive analysis; create (531) an offer campaign (511) with offer terms (513) for targeting a set of users (e.g., offer targets (515)) using a set of offer channels (517), based on the merchant categorization, the propensity association, and the merchant competitive analysis; obtain (533) approval of the offer campaign from the merchant; and distribute (535) offers (186) to the users via the offer channels and redeem benefit of the offers in accordance with the offer terms (513) in connection with payment transactions of the users.

The offer terms (513) and/or the offer targets (515) may include offer rules (203), such as trigger-based targeting criterion (441) and non-trigger based targeting criterion (445).

In one embodiment, after the portal (143) receives a set of merchant parameters (e.g., 507, 503, 505) from a merchant (309), the offer engine (511) uses the profile generator (121) to identify a first set of users of the merchant (309) and a second set of users of competitors of a merchant, based on categorizing the merchant and the competitors.

Based on an analysis of transaction patterns of the first set of user and the second set of users, the offer engine (511) identifies a set of offer terms for an offer campaign (519) proposed for the merchant (309).

After the merchant (309) approves the offer campaign, the offer engine (511) uses the message broker (201) and the media controller (115) to communicate the approved offer (186) of the offer campaign to a third set of users identified for the offer campaign, via one or more offer communication channels identified for the offer campaign.

In one embodiment, the offer (186) is stored, in association with the account data (111) of the user in the offer targets (515), in a data warehouse (149) of a transaction handler (103) of a payment processing network (e.g., as illustrated in FIG. 8). In response to an authorization request received in the transaction handler (103) from a transaction terminal (105) that meets the offer benefit redemption requirements, the transaction handler (103) provides a benefit of the offer (186) to the respective user in the third set using the communication reference (205) associated with the respective account data (111) of the authorization request.

In one embodiment, users in the third set are identified for the offer campaign as part of the generation of the proposed offer (519). The users in the third set are identified based on transaction data (109) of the third set of users and/or the analysis of the transaction patterns of the first set of user and the second set of users.

To categorize the merchant and competitors of a merchant, the profile generator (121) clusters merchants, that are in a same merchant category, into a plurality of merchant micro-categories (305, . . . , 307), including a first merchant micro-category (305) which includes the merchant (309) (e.g., as is a member of the micro-category).

In one embodiment, the clustering of merchants are based on customer micro-segments (301, . . . , 303) of merchants, which can be identified based on a cluster analysis of merchant category codes of payment transactions, transaction amounts of payment transactions, merchant locations of payment transactions, times and dates of payment transactions, etc.

In one embodiment, the profile generator (121) is configured to classify a set of users into a plurality of consumer micro-segments (301, . . . , 303), based at least in part on transaction data (109) of the users, and classify a set of merchants of a merchant category into a plurality of merchant micro-categories (305, . . . , 307), based at least in part on consumer micro-segments of merchants.

In one embodiment, the offer engine (511) is configured to identify differences (361) between a distribution (351, . . . , 353) of consumer micro-segments of a first merchant (309) and a distribution (331, . . . , 333) of consumer micro-segments of a first merchant micro-category (305) that includes the first merchant (309), and apply marketing hypotheses (363) on the differences (361) to generate a proposed offer (519) on behalf of the first merchant (309). The first merchant (309) may review, modify, and/or approve the proposed offer (519) for implementation as the approved offer (186).

In one embodiment, users are classified into the plurality of consumer micro-segments (301, . . . , 303) based on parameters of payment transactions of the users, such as merchant category code, transaction amount, merchant location, transaction time and date.

In one embodiment, the distribution (351, . . . , 353) of consumer micro-segments (301, . . . , 303) of the first merchant (309) identifies strengths of the consumer micro-segments (301, . . . , 303) of the first merchant (309). For example, the strength of each respective consumer micro-segment of a merchant can be a percentage of customers of the merchant in the respective consumer micro-segment in total customers of the merchant.

Merchants can be classified based further on a distribution of ticket sizes (e.g., the size of transaction amount of each transaction).

In one embodiment, the proposed offer (519) is generated to include the identification of users (515) to be targeted for receiving the corresponding approved offer (186). For example, the targeted users may be identified based on affinity to consumer micro-segments (301, . . . , 303) of the first merchant (309).

In one embodiment, the profile generator (121) is configured to classify users into a plurality of consumer micro-segments (305, . . . , 307), based at least in part on transaction data of the users, and uses the transaction data (109) to determine degrees of affinity of a user to the consumer micro-segments (301, . . . , 303) respectively.

In one embodiment, users of payment accounts are classified into consumer micro-segments (e.g., 301, . . . , 303) based on payment transaction parameters, such as merchant categories of merchants receiving payment transactions from the users, transaction amounts of the payment transactions, locations of the payment transactions, etc.

The profile generator (121) is further configured to determine the values of the consumer micro-segments (301, . . . , 303) to the merchant (309), based on the transaction data (109). The values may be determined based at least in part on comparing the strengths of consumer micro-segments of a merchant micro-segment with the strengths of consumer micro-segments of the merchant (309).

In one embodiment, the offer engine (511) is configured to combine the degrees of affinity to the consumer micro-segments (301, . . . , 303) with the values of the consumer micro-segments (301, . . . , 303) to the merchant, to determine whether or not to provide an offer (186 or 519) the merchant to the user.

For example, the degrees of affinity to the consumer micro-segments can be combined with the values of the consumer micro-segments to the merchant via summing the values weighted with the degrees of affinity. Thus, the additive value of a consumer falling in more than one consumer micro-segment is accounted for.

In one embodiment, the offer engine (511) is configured to apply acquisition hypotheses to the result of combining the degrees of affinity to the consumer micro-segments with the values of the consumer micro-segments to the merchant to generate an acquisition value score of the user to the merchant, which score is indicative of offer targeting effectiveness for customer acquisition for the merchant.

In one embodiment, the offer engine (511) is configured to apply loyalty hypotheses to the result of combining the degrees of affinity to the consumer micro-segments with the values of the consumer micro-segments to the merchant to generate an loyalty value score of the user to the merchant, which score is indicative of offer targeting effectiveness for enhancing customer loyalty for the merchant.

In one embodiment, the offer engine (511) is configured to use the acquisition value score and/or the loyalty value score to determine whether or not to provide the offer (186 or 519) of the merchant to the user.

In one embodiment, a computing system is configured to perform the methods discussed above. For example, the computing system is configured via instructions stored on a non-transitory computer-storage medium (167, 179, 175) configured to instruct one or more microprocessors (173) to perform operations discussed above.

The computing system may include at least one of: the transaction handler (103), the data warehouse (149), the portal (143), the offer engine (511), the profile generator (121), the message broker (201), and the media controller (115). The computing system includes at least one microprocessor (173) and memory (167) storing instructions configured to instruct the at least one microprocessors to perform the operations of the system.

Further details on the offer engine can be found in U.S. Pat. App. Pub. No. 2014/0365301, entitled "Systems and Methods to Generate Offers based on Transaction Data", the entire disclosure of which application is hereby incorporated herein by reference.

In one embodiment, a data warehouse (149) as illustrated in FIG. 8 is coupled with the transaction handler (103) to store the transaction data (109) and other data, such as account data (111), and transaction profiles (127). In FIG. 8, a portal (143) is coupled with the data warehouse (149) to provide data or information derived from the transaction data (109), in response to a query request from a third party or as an alert or notification message.

In FIG. 8, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user and the merchant.

Figure 9:
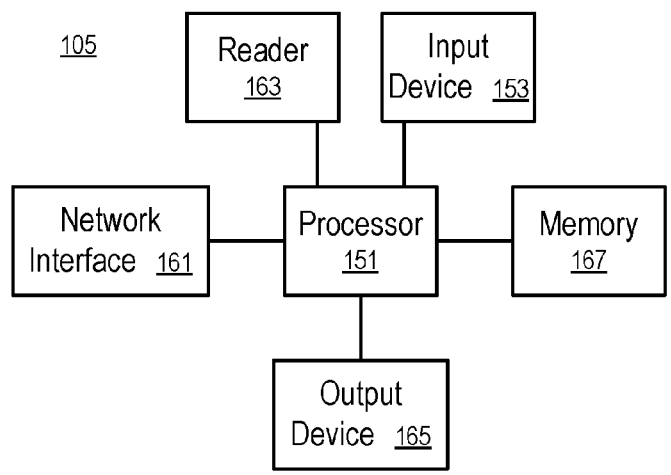
FIG. 9 illustrates a transaction terminal according to one embodiment.
Figure 10:
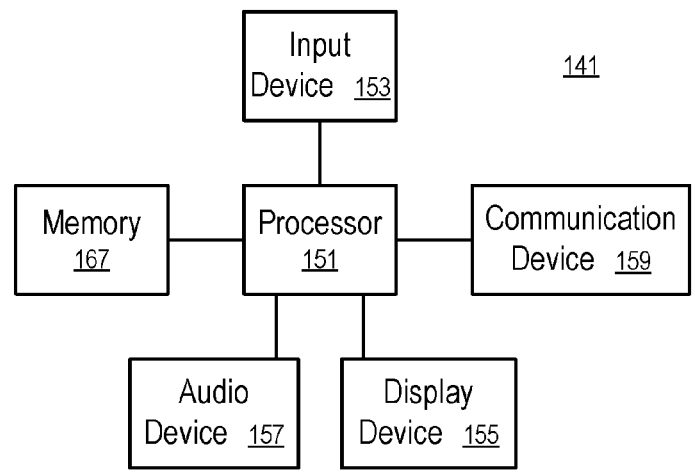
FIG. 10 illustrates an account identifying device according to one embodiment.
Figure 11:
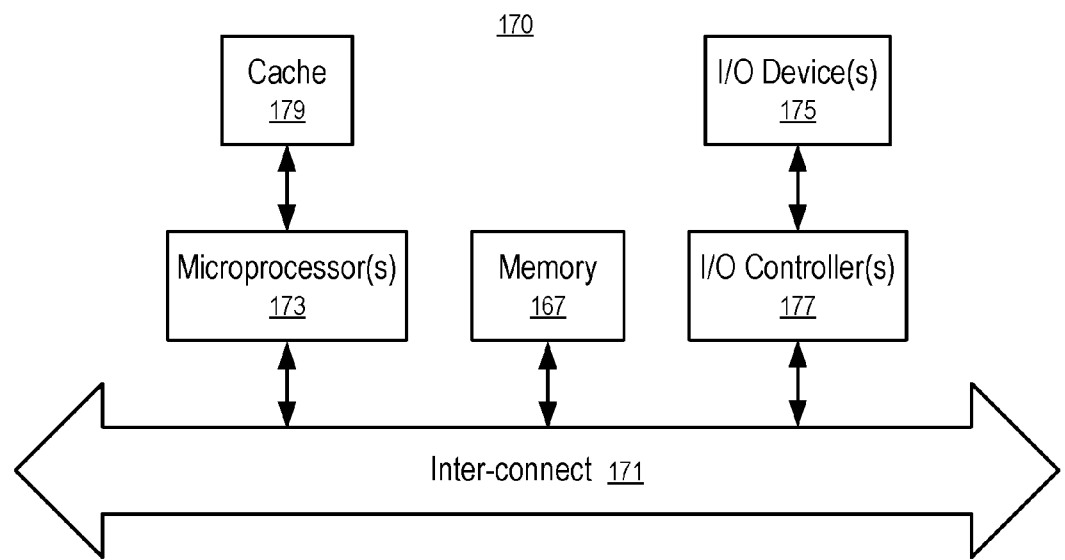
FIG. 11 illustrates a data processing system according to one embodiment.

FIGS. 9 and 10 illustrate examples of transaction terminals (105) and account identification devices (141). FIG. 11 illustrates the structure of a data processing system that can be used to implement, with more or fewer elements, at least some of the components in the system, the transaction handler (103), the portal (143), the data warehouse (149), the account identification device (141), the transaction terminal (105), etc.

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

In FIG. 8, the transaction terminal (105) initiates the transaction for a user (e.g., a customer) for processing by a transaction handler (103). The transaction handler (103) processes the transaction and stores transaction data (109) about the transaction, in connection with account data (111), such as the account profile of an account of the user. The account data (111) may further include data about the user, collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users. The transaction data (109) thus includes information on purchases made by various users at various times via different purchases options (e.g., online purchase, offline purchase from a retail store, mail order, order via phone, etc.)

FIG. 8 shows a system to provide information based on transaction data (109) according to one embodiment. In FIG. 8, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records, such as the transaction profiles (127) or aggregated spending profile. The portal (143) may be implemented as a web portal, a telephone gateway, a file/data server, etc.

In FIG. 8, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user through a web connection. In one embodiment, the user may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such as credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

FIG. 9 illustrates a transaction terminal according to one embodiment. In FIG. 9, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 9. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 9. For example, in one embodiment, the transaction terminal (105) is an ATM machine, which includes components to dispense cash under certain conditions.

FIG. 10 illustrates an account identifying device according to one embodiment. In FIG. 10, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 10, such as a cellular communications subsystem.

In one embodiment, the communication device (159) may access the account information (142) stored on the memory (167) without going through the processor (151).

In one embodiment, the account identification device (141) has fewer components than those illustrated in FIG. 10. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

In one embodiment, the transaction handler (103) is a payment processing system, or a payment card processor, such as a card processor for credit cards, debit cards, etc.

FIG. 11 illustrates a data processing system according to one embodiment. While FIG. 11 illustrates various components of a computer system, it is not intended to represent any particular architecture or manner of interconnecting the components. One embodiment may use other systems that have fewer or more components than those shown in FIG. 11.

In FIG. 11, the data processing system (170) includes an inter-connect (171) (e.g., bus and system core logic), which interconnects a microprocessor(s) (173) and memory (167). The microprocessor (173) is coupled to cache memory (179) in the example of FIG. 11.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any apparatus that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

OTHER ASPECTS

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method, comprising:
   receiving, in a computing apparatus, a plurality of sets of itemized data, wherein each respective set of the itemized data includes a plurality of data fields containing an item description of a product purchased by a customer from a merchant;
   performing, by the computing apparatus, natural language processing on item descriptions in the itemized data;
   classifying, by the computing apparatus, items described by the item descriptions into item tiers based on the natural language processing, including:
      determining presence of predetermined keywords in the item descriptions, and
      scoring the item tiers of the items based on predetermined weights of the predetermined keywords; and
   generating, by the computing apparatus, profiles of merchants and profiles of customers based at least in part on the item tiers classified from the natural language processing of the itemized data, wherein the merchants and the customers are identified in the itemized data.

2. The method of claim 1, wherein the natural language processing includes filtering from the item descriptions to remove words on a predetermined list.

3. The method of claim 1, wherein the natural language processing includes filtering from the item descriptions to remove predetermined patterns of words.

4. The method of claim 1, wherein each item tier is selected from a predetermined set of candidates.

5. The method of claim 1, wherein each item tier is a numerical value in a predetermined range.

6. The method of claim 1, wherein the natural language processing is based on a predictive model of item tier calculated from item description.

7. The method of claim 6, further comprising:
   obtaining a training set of item descriptions and corresponding item tiers assigned by human representatives to item descriptions in the training set; and
   training, by the computing apparatus, the predictive model using the training set of item descriptions and the corresponding item tiers.

8. The method of claim 1, further comprising:
   extracting unit prices and unit counts from the itemized data; and
   determining, from the unit prices and the unit counts, means prices of items described in the itemized data;
   wherein the profiles of the merchants and the profiles of the customers are further based on the means prices of the items described in the itemized data.

9. The method of claim 8, further comprising:
   determining, from the unit counts, item volumes of the merchants in the itemized data;
   wherein the profiles of the merchants and the profiles of the customers are further based on the item volumes of the merchants in the itemized data.

10. The method of claim 9, further comprising:
    determining a price tier for a first merchant from comparing a mean item price of merchants selling a product and a mean item price of the first merchant selling the product.

11. The method of claim 10, further comprising:
    determining a volume tier for the first merchant from comparing a median item volume of merchants selling the product and an item volume of the first merchant selling the product.

12. The method of claim 11, wherein a profile of the first merchant is based on the price tier, the volume tier, and an item tier for the product sold by the first merchant.

13. The method of claim 11, further comprising:
    combining volume tiers of products sold by the first merchant in a merchant category into a volume tier of the merchant category for the first merchant;
    combining price tiers of the products sold by the first merchant in the merchant category into a price tier of the merchant category for the first merchant; and
    combining item tiers of the products sold by the first merchant in the merchant category into an item tier of the merchant category for the first merchant.

14. The method of claim 13, wherein the combining of the volume tiers, the combining of the price tiers, and the combining of the item tiers are in a form of average weighted according to respective item volumes of the products sold by the first merchant in the merchant category.

15. The method of claim 9, further comprising:
    classifying the merchants into merchant categories based on:
       item tiers of items sold by the merchants;
       mean item prices of the items sold by the merchants; and
       item volumes of the items sold by the merchants.

16. The method of claim 15, further comprising:
    classifying the customers into customer categories based on:
       item tiers of items purchased by the customers;
       mean item prices of the items purchased by the customers; and
       item volumes of the items purchased by the customers.

17. The method of claim 15, further comprising:
    classifying the customers into customer categories based on:
       item tiers of items of merchants from which the customers made purchases;
       mean item prices of the items of merchants from which the customers made purchases; and
       item volumes of the items of merchants from which the customers made purchases.

18. The method of claim 16, further comprising:
    matching the customer categories with the merchant categories; and
    providing offers from merchants in a merchant category to customers in a customer category matching with the merchant category.

19. A computing apparatus, comprising:
    a transaction handler configured to processing payment transactions in an electronic payment processing network;
    a portal coupled with the transaction handler and configured to communicate with transaction terminals that initiate the payment transactions in the electronic payment processing network, wherein the portal is configured to receive, using a communication channel outside the electronic payment processing network, itemized data of items purchased via the payment transactions;
    a data warehouse configured to store the itemized data and transaction data recording the payment transactions processed by the transaction handler;

a natural language processing engine configured to performing natural language processing on item descriptions in the itemized data, classify the items described by the item descriptions into item tiers based on the natural language processing by:
  determining presence of predetermined keywords in the item descriptions, and
  scoring the item tiers of the items based on predetermined weights of the predetermined keywords; and
a statistical analyzer configured to identify price tiers, volume tiers, wherein profiles of merchants and customers involved in the payment transactions are generated based at least in part on the item tiers, the price tiers, and the volume tiers.

20. A non-transitory computer storage medium storing instructions which when executed on a computing apparatus, cause the computing apparatus to perform a method, the method comprising:
  receiving, in the computing apparatus, a plurality of sets of itemized data, wherein each respective set of the itemized data includes a plurality of data fields containing an item description of a product purchased by a customer from a merchant;
  performing, by the computing apparatus, natural language processing on item descriptions in the itemized data;
  classifying, by the computing apparatus, items described by the item descriptions into item tiers based on the natural language processing, including:
    determining presence of predetermined keywords in the item descriptions, and
    scoring the item tiers of the items based on predetermined weights of the predetermined keywords; and
  generating, by the computing apparatus, profiles of merchants and profiles of customers based at least in part on the item tiers classified from the natural language processing of the itemized data, wherein the merchants and the customers are identified in the itemized data.

* * * * *